Dec. 28, 1965

J. R. YOUNG 3,225,617

VARIABLE RATIO FRICTION TRANSMISSION AND
CONTROL SYSTEM THEREFOR

Filed Jan. 9, 1961

INVENTOR
JAMES R. YOUNG
BY HIS ATTORNEYS
HARRIS, KIECH, RUSSELL & KERN

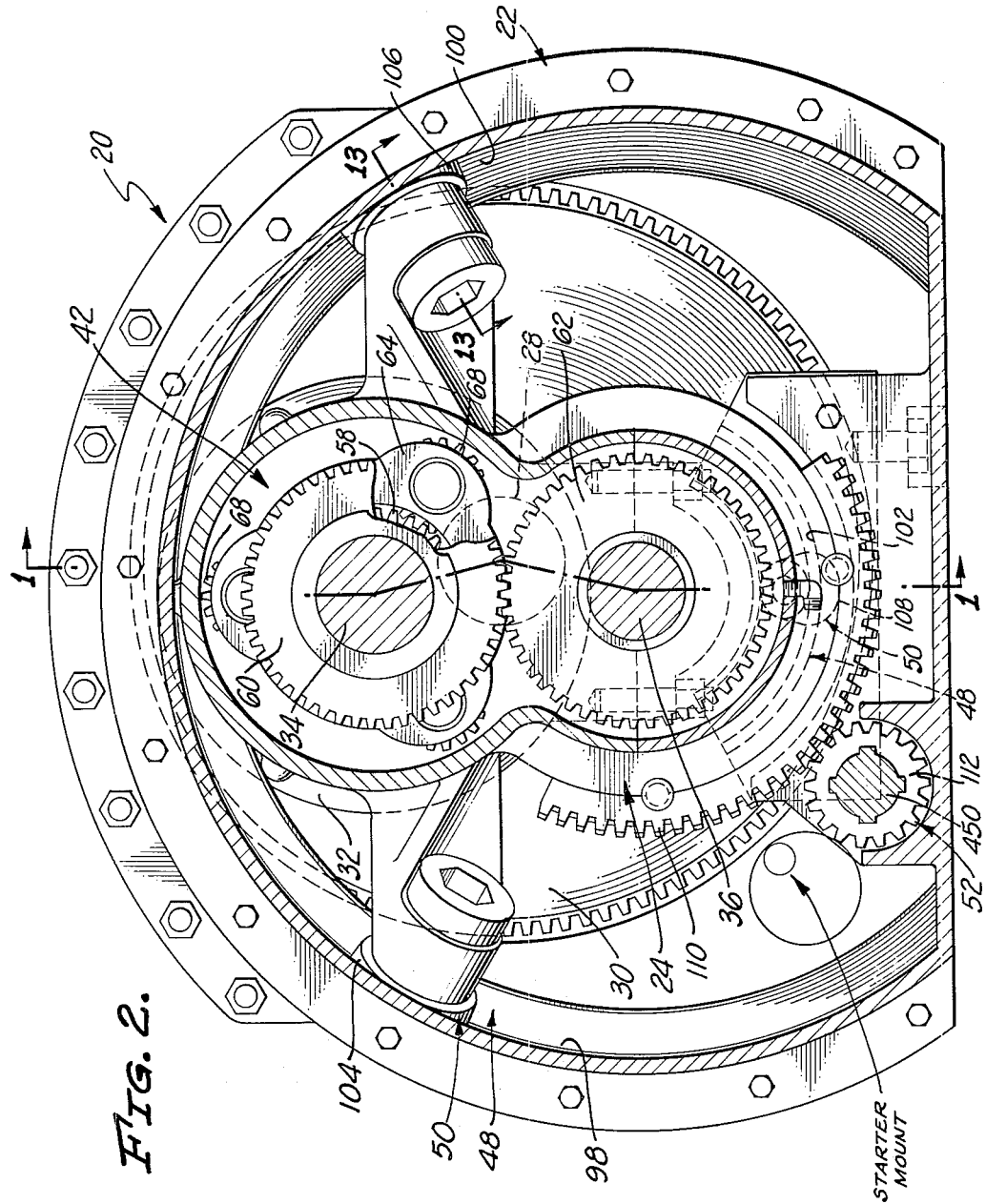

INVENTOR
JAMES R. YOUNG
BY HIS ATTORNEYS
HARRIS, KIECH, RUSSELL & KERN

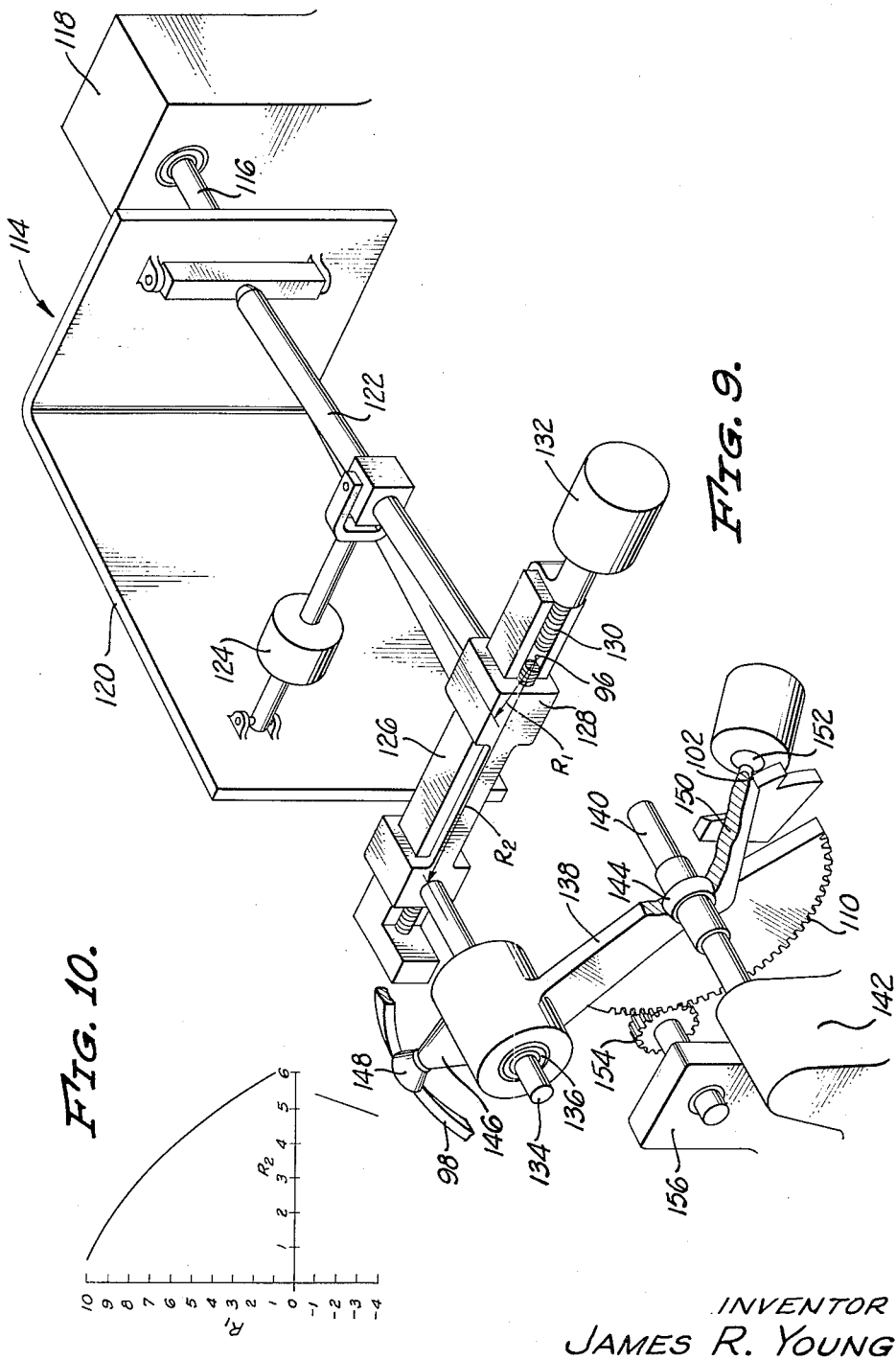

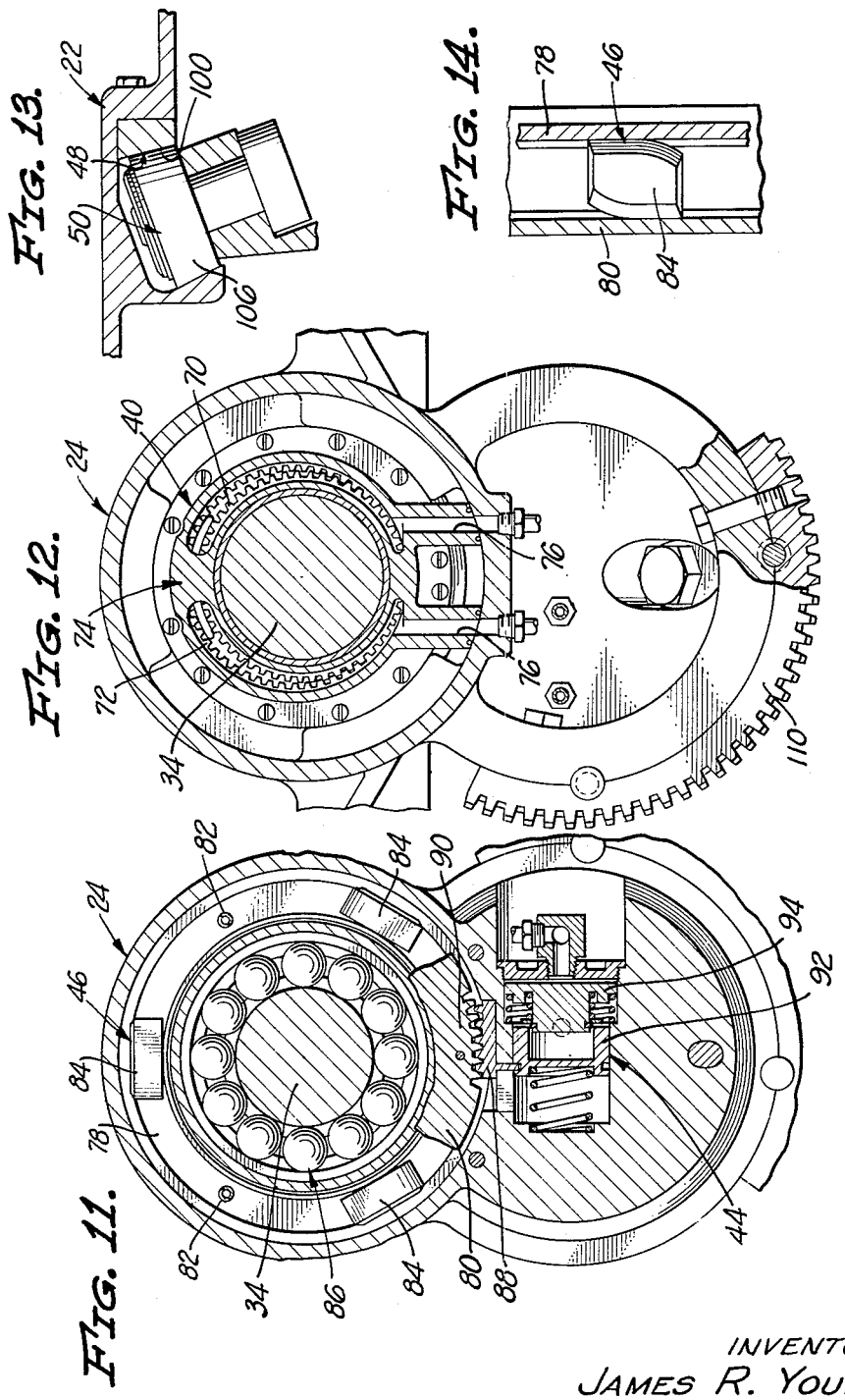

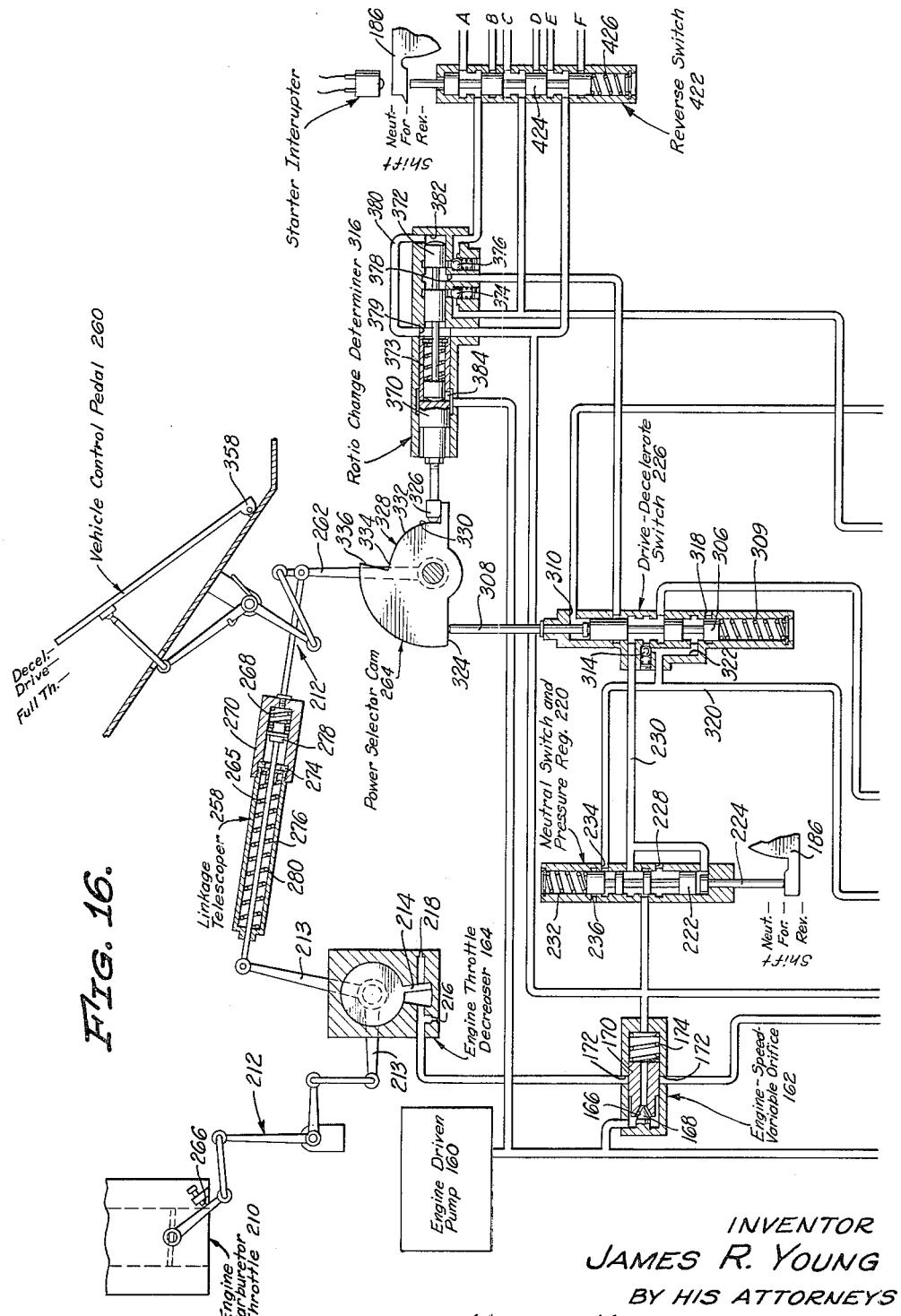

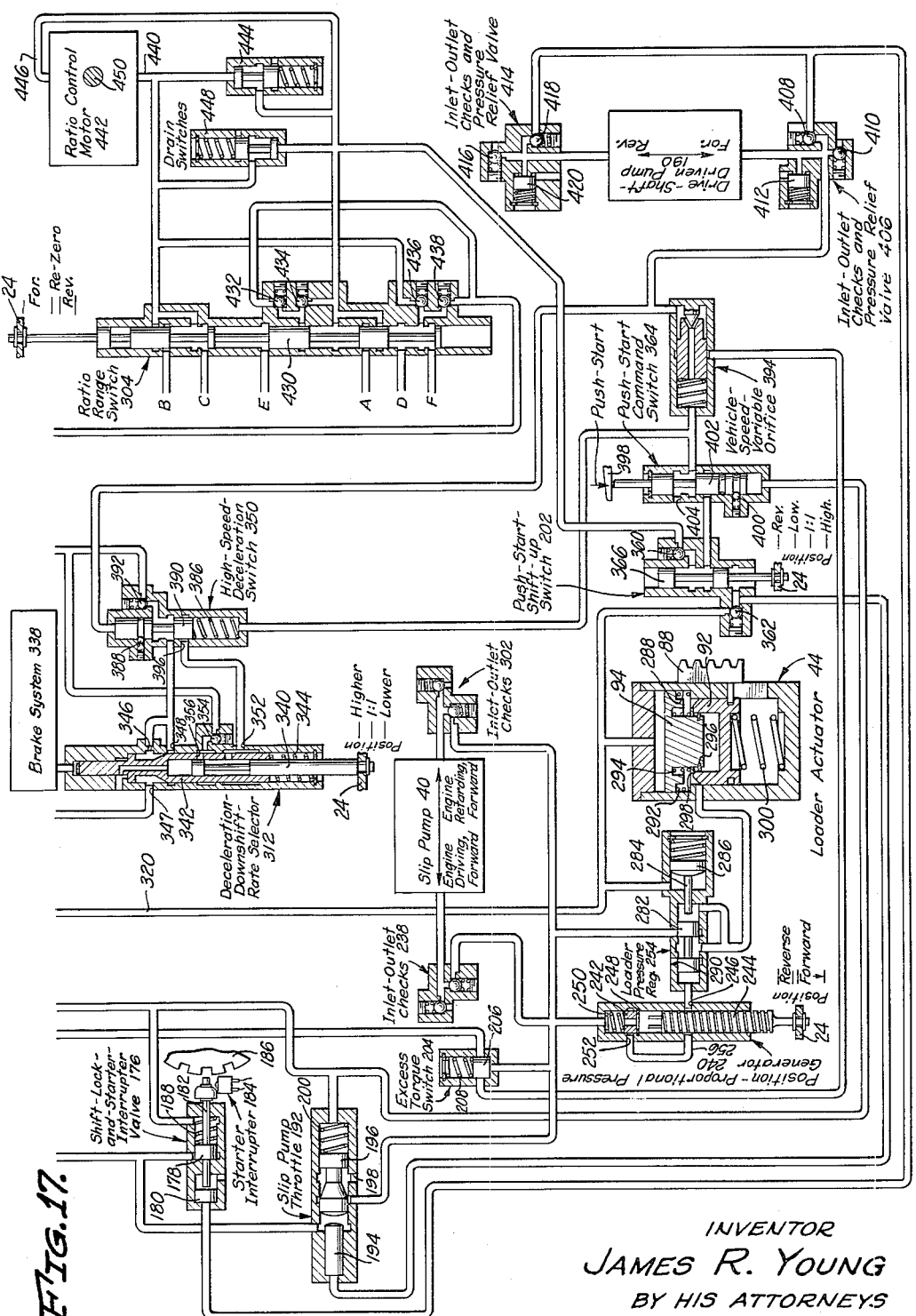

United States Patent Office

3,225,617
Patented Dec. 28, 1965

3,225,617
VARIABLE RATIO FRICTION TRANSMISSION
AND CONTROL SYSTEM THEREFOR
James R. Young, 3630 Regency Drive, Racine, Wis.
Filed Jan. 9, 1961, Ser. No. 81,568
49 Claims. (Cl. 74—472)

The present invention relates in general to a power transmission of the friction type capable of providing an infinite number of ratios of input speed to output speed. While the transmission of the invention is susceptible of other applications, it is of particular utility in automotive vehicles. For convenience, the subject transmission will be considered in connection with a conventional automobile having a front engine location and rear driven wheels, the transmission being located at the rear end of the engine and being coupled to a differential between the rear wheels by a propeller shaft.

Primary general objects of the invention are to provide a transmission which will: reduce fuel consumption by permitting independent selection of engine speed and automobile speed to achieve more efficient combustion and to reduce engine friction losses; increase automobile acceleration by permitting independent selection of engine speed for all automobile speeds, thereby making more power available at any automobile speed; increase maximum automobile speed by permitting the engine to develop its maximum power at the maximum automobile speed; increase both maximum automobile speed and acceleration at any automobile speed by minimizing power losses; increase engine life by reducing engine speed at the automobile speeds normally encountered; reduce engine noise and vibration by reducing the engine speed at normal road speeds; increase the braking effect of the engine on the automobile by providing a continuous driving connection between the engine and the rear wheels; shift from one ratio to another smoothly and without interruption of the driving connection between the engine and the rear wheels; and which will achieve all of the foregoing automatically in response to simple commands by the driver of the automobile.

Secondary general objects of the invention are to provide a transmission which will: reduce the floorboard hump running longitudinally through the center of passenger section of the automobile by providing a compact transmission structure and by providing a transmission output shaft whose axis is located below the axis of the engine crankshaft; simplify the drive for the engine cooling fan since the engine operates at reduced speeds at normal road speeds, and operates at high speeds only at the infrequent intervals that the automobile is driven at higher road speeds; simplify carburetion by permitting the engine to operate at, or nearly at, full throttle during normal driving, instead of at part throttle; limit the torque developed in the drive train leading to the rear wheels so that it is unnecessary to design such drive train to accept high overloads of short duration; limit the engine speed to a predetermined maximum value corresponding to that required for maximum power so as to prevent engine damage from overspeeding; and which will limit the road speed of the automobile to a predetermined maximum value to prevent mechanical damage from overspeeding.

Considering now more specific objects of the invention, perhaps the most important one is to provide an infinitely-variable-ratio friction transmission comprising: rigid driving and driven discs positioned in oblique facing relation and having unyielding surfaces, of metal, ceramic, or the like, which are frictionally engageable with substantially point contact, i.e., small-area contact, therebetween; and means for varying the distance between the centers of the discs and the angle between the axes of rotation thereof in such a manner as to shift the point of contact between the frictionally engageable surfaces of the discs relative to the centers of the discs through a range of positions producing rotation of the driven disc in the same direction as the driving disc, and through a range of positions producing rotation of the driven disc in a direction opposite to that of the driving disc, whereby to propel the automobile in either the forward direction, or the reverse direction.

Another important object is to provide a transmission wherein the range of positions of the point of contact between the discs which corresponds to the forward direction of automobile travel is such as to provide ratios of the speed of the driving disc to that of the driven disc ranging from values considerably greater than one through a value of unity to values less than one, whereby to provide, in the forward direction of automobile travel, a variable ratio underdrive, a direct drive and a variable ratio overdrive.

Another object in connection with the foregoing is to provide a transmission wherein the point of contact between the two discs is always as nearly as possible on a line extending through the centers of the discs, as viewed in the general direction of the axes of the discs, i.e., in the plane of the discs, whereby to minimize slippage between the frictionally engageable surfaces of the discs.

Still another object is to provide a transmission wherein the point of contact between the driving and driven discs is shifted over virtually the entire areas of the frictionally engageable surfaces of the discs, and wherein the configurations of such surfaces are such that they constantly regenerate themselves in use, whereby to automatically compensate for wear without significantly altering the configurations of the frictionally engageable surfaces.

To achieve the foregoing, at least one of the disc surfaces, preferably that of the driving disc, is a surface of revolution generated by rotating a suitable curve about the axis of rotation of the driving disc. Preferably, the frictionally engageable surface of the driving disc is simply a cap-like segment of a spherical surface having a large radius, e.g., of the order of several feet. The frictionally engageable surface of the driven disc may also be a surface of revolution generated by rotating a suitable curve, or other line, about the axis of rotation of the driven disc. However, the frictionally engageable surface of the driven disc may simply be an absolutely flat surface, and the remainder of this specification will largely be restricted to a large-radius spherical surface for the driving disc and a flat surface for the driven disc.

All of the foregoing structural and orientation features of the driving and driven discs provide maximum power transmission, which is an important feature of the invention. More particularly, the structural and orientation features hereinbefore outlined permit maximizing the normal force acting between the frictionally engageable surfaces of the discs, the useful coefficient of friction between such surfaces, and the circumferential velocity of the point of contact, these being three of the factors which determine the power transmitted. The present invention permits maximizing the normal force acting between the disc surfaces both because of the oblique facing arrangement employed, and because of the rigid, unyielding and high-compressive-strength materials used.

The materials employed for the discs also permit a high coefficient of friction between the disc surfaces. Another factor instrumental in permitting the use of a very high coefficient of friction is the high velocity conformity achieved by the invention. In other words, by using unyielding disc surfaces to minimize the area of contact therebetween, and by constantly shifting the point of contact substantially along a line extending through the centers of the discs, there is very little slippage between the contacting portions of the disc surfaces, with the result that very little frictional heat is generated. The foregoing permits operating the driving and driven discs in a bath of a coolant fluid having very low lubricity so as to maintain the desired high coefficient of friction, which may be as high as 0.25, or more.

The final factor, the circumferential speed of the point of contact, may be a maximum with the present invention because of the high velocity conformity hereinbefore mentioned. More particularly, since slippage effects between the disc surfaces, which slippage effects are directly proportional to the circumferential velocity of the point of contact, are minimized in the manner hereinbefore outlined, higher circumferential velocities for the point of contact may be used.

Turning now to other aspects of the invention, an important object thereof is to provide means for maintaining the normal force between the disc surfaces a function of the torque transmitted to the driven disc. A related object is to prevent frictional engagement of the disc surfaces when no torque is being transmitted to the driven disc, as when the disc surfaces are in such relative positions that the point of contact therebetween would lie on the center of the driving disc.

Still another object is to provide a transmission wherein a driven shaft carrying the driven disc is coupled to the aforementioned output shaft by an engageable and disengageable driving connection which provides, in effect, a clutch eliminating any necessity for engagement and disengagement of the driving and driven discs, except under the conditions hereinbefore outlined.

A further object is to provide a transmission wherein the aforementioned driving connection between the driven shaft and the output shaft provides the force biasing the discs into frictional engagement as a function of the torque transmitted to the driven disc.

Still another object is to provide a novel cam means or biasing the driving and driven discs into frictional engagement with a force related to the torque transmitted to the driven shaft, comprising two relatively rotatable rings encircling the driven shaft and respectively acting on the driven shaft and a relatively stationary structure, radially oriented rollers of noncircular cross section between such rings, and means responsive to the torque transmitted to the driven shaft for rotating one of the rings relative to the other.

Another and important object of the invention is to provide a transmission of the foregoing character including an outer housing relative to which the driving disc is rotatably mounted, and an inner housing on which the driven disc is rotatably mounted, the driving and driven discs being located within the outer housing, but externally of the inner housing, and the inner housing being movable within the outer housing to shift the point of contact between the frictionally engageable surfaces of the discs through the ranges of positions hereinbefore outlined. The outer housing may be mounted on the rear end of the engine of the automobile and the driving disc may be mounted on the rear end of the engine crankshaft, the latter thus constituting a driving shaft for the transmission.

Another object is to provide a transmission wherein the driven shaft on which the driven disc is mounted extends into the inner housing and wherein the output shaft of the transmission is rotatably mounted in the inner housing and projects rearwardly from the inner and outer housings for connection to the propeller shaft of the automobile, the output shaft being located in a region where movement thereof along its axis, due to movement of the inner housing within the outer housing, is at a minimum. A related object is to locate such other components as the pump and differential means for providing a driving connection between the driven shaft and the output shaft, the cam means for axially moving the driven disc into frictional engagement with the driving disc, and the means for actuating such cam means as a function of the torque transmitted to the driven shaft, within the inner housing.

Another important object of the invention is to provide a transmission wherein the outer housing contains a high-friction-coefficient coolant which contacts the driving and driven discs, and wherein the inner housing contains a low-friction-coefficient lubricating fluid, there being sealing means for confining the coolant and lubricating fluids within the outer and inner housings, respectively, and for preventing intermingling thereof. With this construction, the coefficient of friction between the disc surfaces may be maintained at a maximum value while providing adequate cooling and, at the same time, proper lubrication may be provided for the components within the inner housing.

A further object of the invention is to provide means for moving the inner housing within the outer housing, to shift the location of the point of contact between the frictionally engageable surfaces of the driving and driven discs in the manner hereinbefore set forth, which includes track means on one of the housings, track follower means on the other of the housings and engaging the track means, and means acting between the two housings for causing relative movement of the track means and the track follower means along the track means.

Yet another object is to provide a power take-off connected to the output shaft within the inner housing and extending from the interior of the inner housing to the exterior of the outer housing, such power take-off being utilized to operate such accessories as a speedometer, an odometer and a hydraulic pump responsive to the road speed of the automobile.

Turning now to still another phase of the invention, an extremely important object is to provide a fluid operated or hydraulic control system which operates the transmission of the invention completely automatically, in response to simple commands by the driver of the automobile, to attain the objects hereinbefore outlined, as well as to attain numerous other objects which will appear hereinafter during the course of a detailed description of the control system.

The foregoing objects, advantages, features and results of the present invention, together with various other objects, advantages, features and results which will either be outlined specifically hereinafter, or which will be evident to those skilled in the variable ratio transmission art in the light of the detailed disclosure hereinafter appearing, may be achieved with the exemplary embodiments of the invention described in detail hereinafter and illustrated in the accompanying drawings, in which:

FIG. 2 is a transverse sectional view taken along the arrowed line 2—2 of FIG. 1;

FIG. 9 is a diagrammatic perspective view illustrating an apparatus for generating track means for producing the desired ratio-shifting movement of the driven disc relative to the driving disc;

FIG. 10 is a graph illustrating one possible relationship between the radii of the point of contact between the discs from the centers of the discs which may be produced by a track means generated with the apparatus of FIG. 9;

Figure 1:
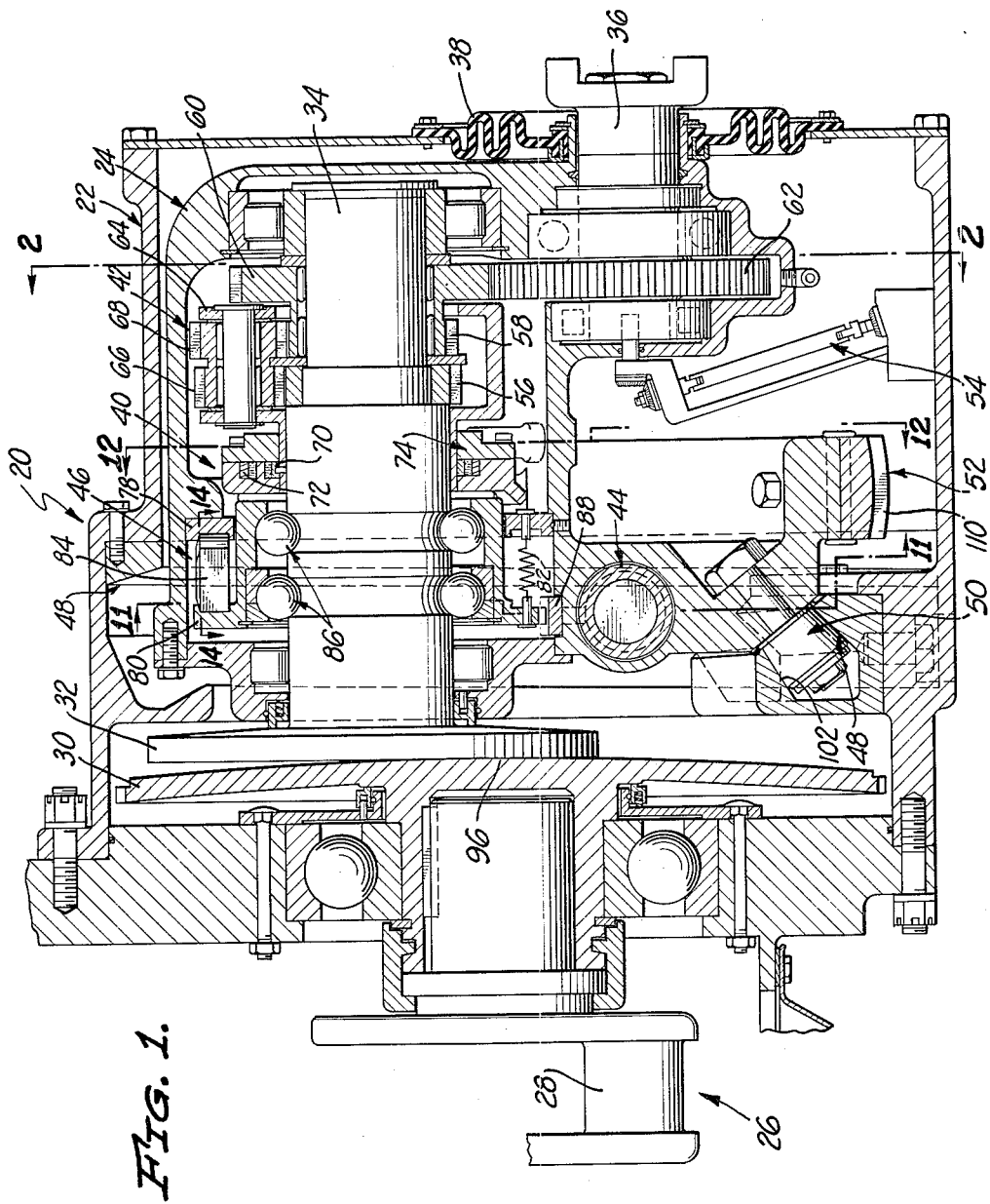
FIG. 1 is a longitudinal sectional view of the mechanical structure of the transmission of the invention and is taken as indicated by the arrowed line 1—1 of FIG. 2.
Figure 4:
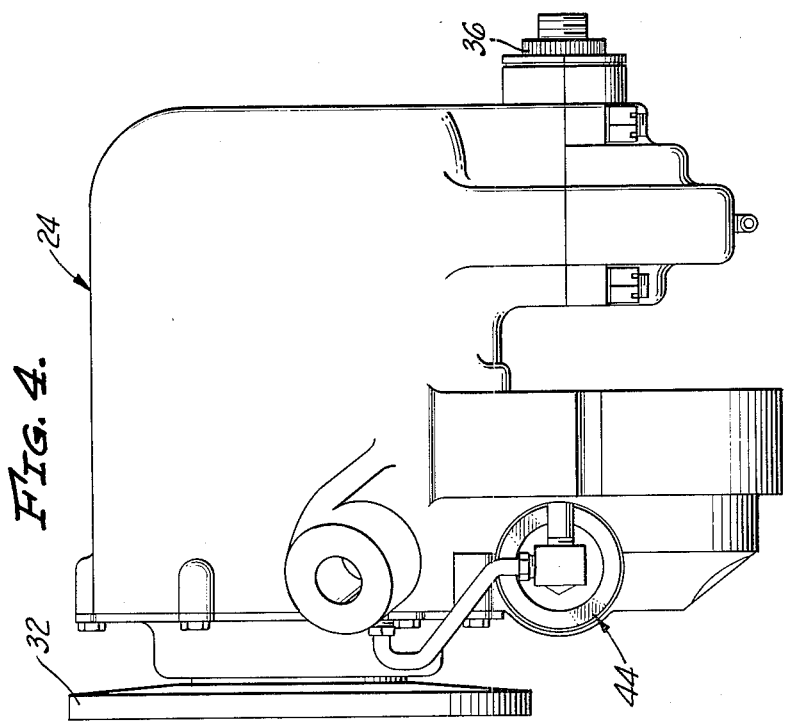
FIG. 4 is a side elevational view of the inner housing, and the aforementioned components which it carries.
Figure 3:
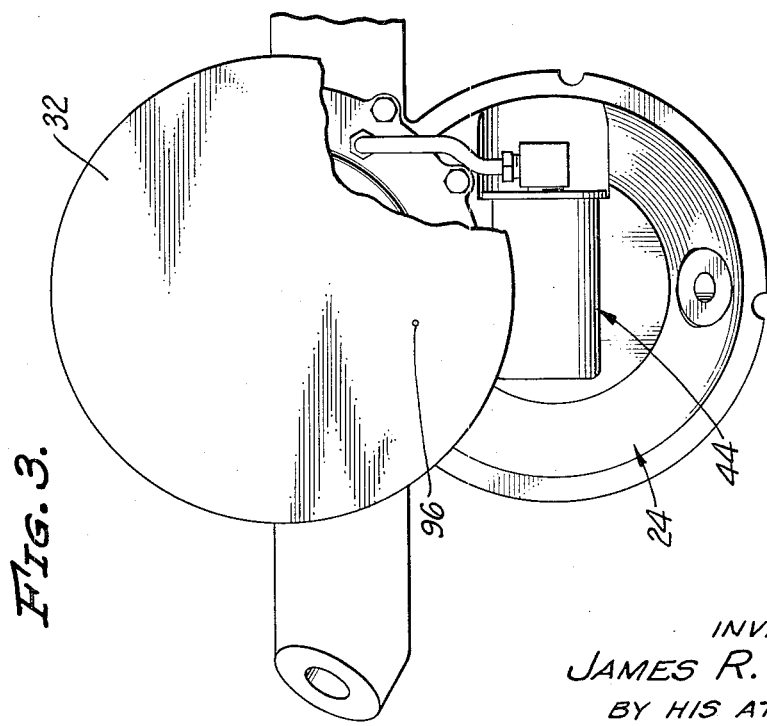
FIG. 3 is a front elevational view of the inner housing of the transmission of the invention, and of various components carried thereby.
Figure 5:
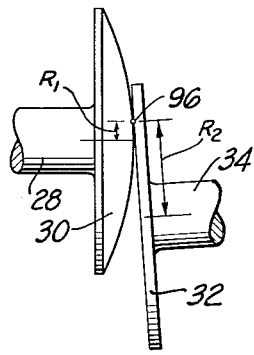
FIGS. 5, 6, 7 and 8 are semidiagrammatic side elevational views of driving and driven discs of the transmission in different relative positions producing different ratios, these views being taken in directions perpendicular to lines extending through the centers of the driving and driven discs so that these views are all taken from different vantage points.
Figure 15:
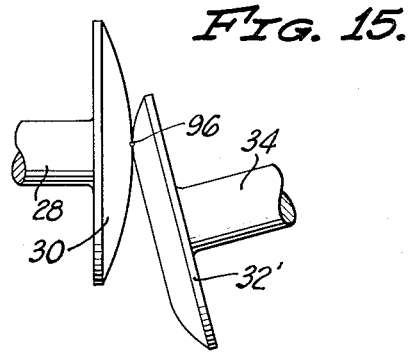

FIGS. 11 and 12 are fragmentary transverse sectional views respectively taken along the arrowed lines 11—11 and 12—12 of FIG. 1;

FIG. 13 is an enlarged, fragmentary sectional view taken along the arrowed line 13—13 of FIG. 2;

FIG. 14 is an enlarged, fragmentary sectional view taken along the arrowed line 14—14 of FIG. 1;

FIG. 15 is a semidiagrammatic side elevational view which is similar to FIG. 5, but which illustrates another driven disc embodiment of the invention; and FIGS. 16 and 17 are diagrammatic views of a hydraulic transmission control system of the invention, FIG. 17 being a continuation of FIG. 16.

TRANSMISSION 20

*General components.*—The infinitely-variable-ratio friction transmission of the invention is designated generally by the numeral 20 and includes an outer housing 22 and an inner housing 24 movably mounted within the outer housing in a manner to be described hereinafter. The outer housing 22 is mounted on the rear end of an internal combustion engine 26 having the usual crankshaft 28, the latter sometimes being referred to herein as the driving shaft of the transmission 20.

Within the outer housing 22 and forwardly of the inner housing 24 are frictionally engageable driving and driven discs 30 and 32 in facing relation, this facing relation being oblique under certain conditions of operation of the transmission 20, as will be described hereinafter. The driving disc 30 is connected to the crankshaft 28 for rotation therewith in any suitable manner, and serves as the flywheel of the engine 26. Preferably, the circumference of the driving disc 30 is provided with gear teeth for engagement by an electric starter, not shown, in the conventional manner.

The driven disc 32 is mounted on and is rotatable with a driven shaft 34 which extends into and is rotatably mounted in the inner housing 24. The axes of the crankshaft 28 and the driven shaft 34 extend in the same general direction, but are obliquely related under some conditions, as will be described hereinafter.

Below and parallel to the driven shaft 34 and rotatably mounted in the inner housing 24 is an output shaft 36 which projects rearwardly from the inner and outer housings 24 and 22. A flexible seal 38 surrounds the output shaft 36 and interconnects the two housings 22 and 24 to permit movement of the inner housing 24 and the output shaft 36 relative to the outer housing 22, as will be described. It might be well to state at this point that the output shaft 36 is located in a region where movement of the inner housing 24 relative to the outer housing 22 is at a minimum in the direction of the axis of the output shaft.

The rear end of the output shaft 36 is connected, by means of a universal joint, not shown, to a drive train leading to the usual differential, not shown, between the rear, driving wheels of the automobile. Such drive train may include a conventional propeller shaft, not shown, and includes a conventional telescoping joint, not shown, to compensate for axial movement of the output shaft 36 incident to movement of the inner housing 24 relative to the outer housing 22.

It will be noted that the axis of the output shaft 36 is located below the axis of the crankshaft 28, thereby permitting lowering of the entire drive train between the output shaft and the differential between the driving wheels of the automobile. This has the effect of reducing the height of the usual floorboard hump extending longitudinally through the passenger section of the automobile. The transmission 20 itself is smaller than conventional automatic transmissions, which further reduces the size of the usual floorboard hump.

There is an engageable and disengageable driving connection between the driven shaft 34 and the output shaft 36 which includes a pump and differential means comprising a hydraulic slip pump 40 and a planetary differential 42. As will be described, the driving connection between the driven shaft 34 and the output shaft 36 is engaged by restricting the discharge of the slip pump 40.

The output from the slip pump 40 is also utilized to energize an actuating means or loader actuator 44 for a cam means 46 which biases the driven disc 32 into frictional engagement with the driving disc 30 with a force that is a function of the torque transmitted to the driven shaft 34.

The direction of rotation of the driven shaft 34 relative to that of the crankshaft 28, and the ratio of the speed of the crankshaft to that of the driven shaft, are varied by moving the inner housing 24 within the outer housing 22 to vary the location of the point of contact between the driving and driven discs 30 and 32 by varying the distance between the centers of these discs and the angle between the axes of rotation thereof, as will be described in more detail hereinafter. Considered generally, the transmission 20 includes shifting means for moving the inner housing 24 within the outer housing 22 which includes track means 48, FIGS. 1 and 2, on the outer housing, track follower means 50 on the inner housing, and positioning means 52, FIG. 2, for causing movement of the track follower means along the track means. It will be understood that the configuration of the track means 48 is such as to provide the desired shifting of the point of contact between the driving and driven discs 30 and 32. It will suffice at present to state that the point of contact between the driving and driven discs 30 and 32 is shifted through two ranges of positions respectively corresponding to forward and reverse travel of the automobile, the range of positions corresponding to forward travel providing and underdrive, a direct drive and an overdrive. The manner in which the track means 48 may be generated to produce the desired ranges of positions for the point of contact between the driving and driven discs 30 and 32 will be considered hereinafter in connection with FIGS. 9 and 10 of the drawings.

The inner housing 24 contains a hydraulic fluid, similar to that customarily employed in conventional contemporary automotive transmissions, having good lubricating qualities so as to lubricate the various components within the inner housing. On the other hand, the space between the inner and outer housings contains a low-lubricity fluid which permits achieving a high coefficient of friction between the frictionally engageable surfaces of the driving and driven discs 30 and 32, and which acts primarily as a coolant for dissipating heat from the driving and driven discs. Suitable shaft seals are provided wherever necessary to confine the lubricating fluid within the inner housing 24 and the collant fluid within the outer housing 22, and to prevent intermingling of these fluids. Such shaft seals appear in FIG. 1 of the drawings and it is thought unnecessary to identify them specifically.

The transmission 20 of the invention also includes a power take-off 54 which is suitably connected at one end to the front end of the output shaft 36 and which extends from that point through the inner and outer housings 24 and 22 to a point where it is accessible from the exterior of the outer housing. The power take-off 54, which will not be described in detail, is shown in FIG. 1 of the drawings as comprising universal joints and a telescoping joint which compensate for the movement of the inner housing 24 relative to the outer housing 22 incident to varying the transmission ratio and the direction of rotation of the output shaft 36. The power take-off 54 may be utilized to drive a combined speedometer and odometer, not shown, and to drive a hydraulic pump which will be considered hereinafter in connection with the transmission control system of the invention.

The foregoing completes a general description of the mechanical structure of the transmission 20, and certain of the components thereof will now be considered in more detail under appropriate subheadings.

*Discs 30 and 32.*—In the embodiment of the invention under consideration, the driving and driven discs 30 and 32 have frictionally engageable surfaces which are a segment of a spherical surface and a plane surface, respectively. To minimize the movement of the housing 24 necessary to shift the point of contact between the driving and driven discs 30 and 32 throughout the reverse and forward ranges of positions hereinbefore discussed, the radius of the frictionally engageable surface of the driving disc 30 is quite large so that this disc surface is nearly plane, its curvature being exaggerated in FIG. 1 of the drawings and being even more exaggerated in FIGS. 5 to 8 and 15 thereof. For example, the radius of curvature of the surface of the driving disc 30 may be of the order of several feet.

The driving and driven discs 30 and 32 are rigid members, preferably metallic, and the frictionally engageable surfaces thereof are also rigid and unyielding, as compared to the friction materials commonly used in friction transmissions. The frictionally engageable surfaces of the driving and driven discs 30 and 32 may be metallic, or they may be formed of ceramic materials, or other hard and unyielding materials.

With the foregoing construction, contact between the disc surfaces occurs over an area which is very small as compared to the areas of the disc surfaces themselves, the contact between the disc surfaces being referred to herein as comprising substantially point contact. This maintains the good velocity conformity which the transmission 20 achieves, such velocity conformity being an important factor in the high power transmitting capabilities of the transmission, as hereinbefore discussed. The materials utilized for the frictionally engageable surfaces of the driving and driven discs 30 and 32, and for the driving and driven discs themselves, also permit high normal forces between the disc surfaces at the point of contact, which is also an important factor in providing high power transmitting capabilities, as outlined previously.

Summarizing, the transmission 20 of the invention achieves a high normal force between the surfaces of the driving and driven discs 30 and 32, a high coefficient of useful friction or traction between such surfaces, and a high circumferential velocity of the point of contact between such surfaces, all of which go to maximizing the power transmitting capabilities of the transmission.

It will be noted from FIG. 1 of the drawings, and particularly from FIGS. 5 to 8 thereof, that the selected configurations for the frictionally engageable surfaces of the driving and driven discs 30 and 32 avoid any sharp edges leading into the point of contact. This avoids any cutting action of either disc surface, wear thereof being smooth and uniform. Also, as FIGS. 5 to 8 clearly illustrate, the point of engagement between the driving and driven discs 30 and 32 is shifted over large areas of the discs to distribute wear. Thus, in normal use of the transmission 20, the entire working areas of the frictionally engageable surfaces of the driving and driven discs 30 and 32 wear smoothly and are constantly regenerated.

*Alternative discs.*—Various other disc surface configurations and combinations of configurations may be utilized to achieve the foregoing results. FIG. 15 of the drawings shows, for example, the driving disc 30 in engagement with a driven disc 32' which has a plane central surface surrounded by an annular surface of revolution which is arcuate in cross section, both the plane surface and the arcuate annular surface of the driven disc 32' being tangentially engageable with the spherical surface of the driving disc 30.

An important advantage of the disc combination shown in FIG. 15 of the drawings is that the angle of the axis of the driven disc 32' to that of the driving disc 30 is nearly constant for all ratios, and can be maintained exactly constant under some circumstances. This is important since it reduces the angle of misalignment which must be compensated for by universal joints in the drive train leading from the transmission to the differential of the automobile.

*Pump 40 and differential 42.*—As previously suggested, the present invention avoids engaging and disengaging the driving and driven discs 30 and 32 under load when there is a significant difference in the velocities of the portions of the disc surfaces which engage at the point of contact, since this would result in excessive wear. Consequently, the driven shaft 34 is permitted to rotate when the engine is at or near idle speed and when the automobile is stationary so that the output shaft 36 is stationary. This is accomplished by the slip pump 40 and the differential 42.

The differential 42 includes an input sun gear 56 driven by the driven shaft 34 and an output sun gear 58 rotatable about the driven shaft and having connected thereto a gear 60 in mesh with a gear 62 fixed on the output shaft 36. If desired, an idler gear, not shown, may be interposed between the gears 60 and 62. As will become apparent, this would produce rotation of the output shaft 36 in the same direction as the driven shaft 34.

Rotatable about the driven shaft 34 is a planet carrier 64 on which are rotatably mounted three circumferentially spaced pairs of interconnected planet gears 66 and 68, the planet gears 66 being meshed with the input sun gear 56 and the planet gears 68 being meshed with the output sun gear 58. The two sets of planet gears 66 and 68 operate on slightly different pitch diameters. Either set may operate on the larger pitch diameter since the difference in pitch diameters only slightly affects the speed of the output sun gear 58 when the carrier is stationary. It will be understood that the slightly different pitch diameters may be achieved by using slightly different numbers of teeth for the input and output sun gears 56 and 58.

Although there is very little difference in the speeds of the input and output sun gears 56 and 58 when the planet carrier 64 is at rest, if the planet carrier is not prevented from rotating, it will rotate at a speed which is many times the difference in the speeds of the two sun gears. Under such conditions, of course, no torque is transmitted through the planetary differential 42. On the other hand, when the planet carrier 64 is at rest, the planetary differential 42 transmits the driven shaft torque to the ouput sun gear 58 at substantially the same speed as that of the driven shaft 34, this torque being transmitted to the output shaft 36 through the gears 60 and 62.

For a given differential ratio, i.e., for a given ratio of the unrestrained rotational speed of the planet carrier 64 to the difference between the speeds of the input and output sun gears 56 and 58, the torque on the output sun gear 58 will equal the product of the torque on the planet carrier and the differential ratio. The sum of the power transmitted through the planet carrier 64 and the power transmitted to the output sun gear 58 must equal the power at the input sun gear 56. Since the input and output sun gears 56 and 58 are nearly the same size, the torque on one is very nearly equal to the torque on the other.

For the condition where the output sun gear 58 is at rest and where it is desired to apply a torque to it, it will be clear that all of the power is actually transmitted to the planet carrier 64 since power is proportional to the product of speed and torque. Now, substantially this same torque acts on the input sun gear 56, at the speed of this gear. Therefore, to minimize the power transmitted to the planet carrier 64, the speed of the input sun gear 56 must be minimized. Since the minimum speed of the engine is its idle speed and since the speed of the input sun gear 56 is equal to the engine speed divided by the ratio provided by the driving and driven discs 30 and 32, it will be apparent that to minimize the speed of the input sun gear, the speed ratio of the discs should be as low as possible. Wih the present invention, it is possible to make the ratio provided by the driving and driven discs 30 and 32 low enough so that the power transmitted to the planet carrier 64 is small enough that it is possible to drive a simple hydraulic pump at the speed and torque multiplication of the planet carrier 64, the pump in question being the slip pump 40.

The slip pump 40 is of the internal gear type and includes, as best shown in FIG. 12, an inner gear 70 concentric with the driven shaft 34 and an outer gear 72 which is eccentric to the inner gear. These gears are rotatable in a housing 74 having ports 76 one of which is an inlet port in communication with the inner housing 24 and the other of which is an outlet port. The inner gear 70 is connected to and driven by the planet carrier 64.

With the foregoing construction, when the discharge of the slip pump 40 is not throttled, the planet carrier 64 is free to rotate so that no torque is transmitted by the planetary differential 42. On the other hand, by throttling the discharge of the slip pump 40, the speed of the planetary carrier 64 can be reduced to zero so that full torque power transmission by the planetary differential 42 occurs. This throttling of the slip pump discharge, which will be discussed further hereinafter in connection with the control system of the invention, is progressive so that very smooth engagement of the driving connection between the driven shaft 34 and the output shaft 36 occurs, the same being true for disengagement of this driving connection.

Theoretically, when the slip pump discharge is not throttled, there is no restraint on the rotation of the planet carrier 64 and thus no torque transmission. In actual practice, however, frictional resistance to fluid flow imposes some restraint on the planet carrier 64 so that some torque is transmitted by the differential 42. Thus, when the engine is idling with the automobile at rest, there is a slight tendency for the automobile to creep in the same manner as with any conventional automatic transmission, such creeping being controlled by the brakes of the automobile in the usual manner.

When it is desired to accelerate the automobile, the slip pump discharge is progressively throttled, as will be discussed hereinafter in more detail. Thus, the power transmitted by the differential 42 is progressively increased until such time as the discharge from the slip pump 40 is throttled to the maximum extent, at which time virtually all of the power in the driven shaft 34 is transmitted to the output shaft 36.

The pressure from the slip pump 40 is always in direct proportion to the torque being transmitted and this fact is utilized in maintaining the normal force between the driving and driven discs 30 and 32 at the point of contact therebetween at a value which is a function of the transmitted torque, as will be discussed in a subsequent section. Only a very small fluid flow from the slip pump 40 is required for this purpose, such small fluid flow being maintained when the slip pump discharge is throttled to the maximum extent. Since the portion of the slip pump discharge required for maintaining the driving and driven discs 30 and 32 in engagement is small, the power loss represented thereby is negligible.

The pump and differential combination 40 and 42 provides a relatively rigid coupling which permits maximum use of the braking effect of the engine of the automobile, as will be covered later. However, the coupling provided by the pump 40 and the differential 42 does have some flexibility so that it minimizes the effect of torsional vibrations in the drive train.

It will be apparent that when there is a reversal of torque through the transmission 20, such as occurs when the automobile is decelerating or descending a grade, the planet carrier 64 tends to be driven in the reverse direction. This reverses the ports 76, check valves being provided to compensate, as will be described in connection with the control system of the invention.

If for any reason during operation of the transmission 20, the torque exceeds a safe level as reflected by the discharge pressure of the slip pump 40, a relief valve opens and permits flow from the pump 40 to operate an actuator which will reduce the engine throttle setting. This will also be discussed in more detail hereinafter in connection with the hydraulic control system.

*Cam means 46.*—The cam means 46 for biasing the driven disc 32 into frictional engagement with the driving disc 30 is annular and encircles the driven shaft 34. More particularly, the cam means 46 includes two opposed thrust rings 78 and 80 biased toward each other by springs 82 and adapted to be separated by radially oriented rollers 84 of noncircular cross section retained in facing annular grooves in the rings. The ring 78 is stationary and is suitably mounted in the inner housing 24. The ring 80 is rotatable relative to the ring 78 about the axis of the driven shaft 34. A thrust bearing assembly 86 is interposed between the rotatable ring 80 and the driven shaft 34 to permit rotation of the driven shaft relative to the rotatable ring, and to transmit axial movement of the rotatable ring to the driven shaft so as to bias the driven disc 32 into frictional engagement with the driving disc 30.

As will be apparent, when the rotatable ring 80 is rotated slightly relative to the stationary ring 78, the rotatable ring is moved axially by the noncircular rollers 84 to achieve the desired frictional engagement between the driving and driven discs 30 and 32. The springs 82 serve to restore the rotatable ring 80 to its original position when the turning force applied thereto is removed, thereby disengaging the driven disc 32 from the driving disc 30. As will be explained in more detail hereinafter, such separation of the driving and driven discs 30 and 32 occurs whenever the point of contact between the driving and driven discs would lie on the center of the driving disc, this corresponding to the neutral position of the transmission 20 and being shown in FIG. 1 of the drawings. Thus, the overheating of the driving and driven discs which would otherwise result with the transmission 20 in neutral is avoided.

The cross sectional configuration of the rollers 84 is important and is best shown in FIG. 14 of the drawings. Each roller 84 is so shaped that the distance of its working surfaces from the center of the roller increases in direct proportion to the central angle. In other words, each roller 84 may be regarded as being a cylindrical roller to which have been added two diametrically opposite inclined planes or wedges wrapped around the cylindrical roller. This configuration is more precisely described as a portion of the involute of a circle considerably removed from the base circle. With such a configuration for the rollers 84, the principal radii of contact with the rings 78 and 80 are very high, which is an important feature.

Other advantages of the cam means 46 are that it has a high load capacity, operates in a nonrotating fashion with the resultant elimination of centrifugal effects, utilizes cam surfaces which are easy to generate with accuracy, is self aligning so that the rollers 84 share the load equally, and the like.

*Actuating means 44.*—The actuating means or loader actuator 44 applies the aforementioned turning force to the rotatable ring 80 and, as best shown in FIG. 11 of the drawings, includes a rack 88 meshed with a gear segment 90 on the periphery of the rotatable ring. The rack 88 is adapted to be moved to rotate the ring 80 by dual pistons 92 and 94. As will be described in more detail hereinafter in connection with the hydraulic control system of the invention, the piston 92 is actuated by the discharge from the slip pump 40, while the piston 94 is actuated by a pre-load pressure, supplied from another source, to produce initial driving contact between the driving and driven discs 30 and 32.

*Motion of inner housing 24.*—As previously outlined, the motion of the inner housing 24 relative to the outer housing 22 is such as to shift the point of contact between the surfaces of the driving and driven discs 30 and 32 through two ranges of positions respectively corresponding to reverse and forward travel of the automobile, the range of positions corresponding to forward travel providing underdrive, direct drive and overdrive ratios. Preferably, the point of contact is between the centers of the driving and driven discs 30 and 32 for the range of positions corresponding to reverse travel and the centers of the discs are on the same side of the point of contact for the range of positions corresponding to forward travel. Also, the point of contact always lies substantially on a line extending through the centers of the driving and driven discs 30 and 32, when viewed in elevation, to maintain maximum velocity conformity. Between the two ranges of positions for the point of contact, the driving and driven discs 30 and 32 are disengaged, as will be explained later, to provide the neutral zone mentioned, this zone also being referred to hereinafter as the re-zero zone or range.

FIGS. 5 to 8 of the drawings illustrate diagrammatically the type of motion which the driven disc 32 undergoes relative to the driving disc 30. In considering these figures, it should be kept in mind that they are elevational views taken from points perpendicular to lines extending through the centers of the two discs. Thus, each of these figures is taken from a different vantage point.

In FIG. 5 of the drawings, the discs 30 and 32 are shown in contact at a point 96 at a relatively short radius $R_1$ from the axis of the disc 30 and at a relatively long radius $R_2$ from the axis of the disc 32. Thus, the disc 32 is driven in the same direction as the disc 30 with a ratio of $R_1$ to $R_2$ of less than unity. This may be regarded as corresponding to an underdrive condition in the forward direction of automobile travel.

Figure 6:
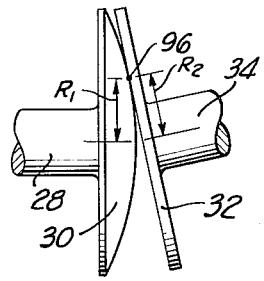

FIG. 6 of the drawings shows $R_1$ and $R_2$ equal with the centers of the discs 30 and 32 on the same side of the point of contact 96. Thus, this corresponds to a ratio of one or direct drive.

Figure 7:
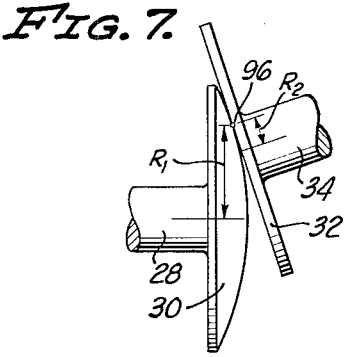

Referring to FIG. 7, $R_1$ is large as compared to $R_2$, the centers of the discs 30 and 32 still being on the same side of the point of contact 96. This condition may be regarded as providing an overdrive in the forward direction of automobile travel.

Figure 8:
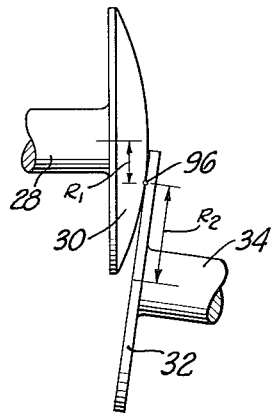

In FIG. 8, the point of contact 96 is between the centers of the discs 30 and 32 so that the direction of rotation of the driven disc 32 is reversed relative to the driving disc 30. The ratio of $R_1$ to $R_2$ is less than one, so that an underdrive ratio is provided. Normally, there is no necessity for a direct drive ratio or an overdrive ratio in the reverse direction of automobile travel.

It will be understood that there are numerous possible intermediate positions between the positions shown in FIGS. 5 and 6 and between the positions shown in FIGS. 6 and 7. Similarly, the point of contact may be shifted through a range of positions of which that shown in FIG. 8 is but one.

Also, it will be understood that the various positions shown in FIGS. 5 to 8 of the drawings for the contact point 96 are illustrative only. The exact contact point positions and ranges of contact point positions will depend upon the particular automotive, or other, intsallation.

*Track and track follower means 48 and 50.*—In order to shift the position of the contact point 96 between the driving and driven discs 30 and 32 through the desired ranges of positions accurately, the track and track follower means 48 and 50 provide three-point guidance for the movable housing 24. As shown in FIGS. 1 and 2 of the drawings, the track means 48 comprises three tracks or track grooves 98, 100 and 102 carried by the outer housing 22. The track follower means 50 comprises corresponding track followers 104, 106 and 108 respectively disposed in the tracks 98, 100 and 102. Preferably, the track followers 104, 106 and 108 are frusto-conical rollers, the tracks 98, 100 and 102 having complementary cross sections.

The tracks 98, 100 and 102 extend approximately circumferentially of the outer housing 22 and are so shaped as to impart the desired shifting movement to the driven disc 32. Movement of the track followers 104, 106 and 108 along the respective tracks 98, 100 and 102 is effected by the positioning means 52 for the movable housing, this positioning means comprising simply a gear segment 110, FIGS. 1 and 2, on the movable housing and a pinion gear 112 meshed with the gear segment 110 and carried by the stationary housing 22.

The motion of the inner housing 24 which is produced by the track and track follower means 48 and 50 may be regarded as approximating a pivoting motion about a shifting point on the axis of the output shaft 36 and in the plane of the gear segment 110. While approximately a pivoting motion, the motion of the movable housing 24 differs from a pivoting motion in that it moves forwardly and rearwardly slightly and also rotates or cocks slightly in various planes passing through the shifting point on the axis of the output shaft 36. Thus, the tracks 98, 100 and 102 guide the respective track followers 104, 106 and 108 along warped paths.

In view of the foregoing, and in view of the fact that the exact configurations of the tracks 98, 100 and 102 are determined by the desired relationship between $R_1$ and $R_2$ for a particular set of conditions, the track configurations may best be disclosed by disclosing an apparatus for generating them for any set of conditions. This will be done in connection with FIGS. 9 and 10 of the drawings.

*Track generating apparatus.*—Referring to FIG. 9 of the drawings, illustrated therein is an apparatus 114 for generating the tracks 98, 100 and 102 for any desired relationship of the radii $R_1$ and $R_2$ to the point of contact 96. One such possible relation between $R_1$ and $R_2$ is shown in FIG. 10 of the drawings, the positive values of the $R_1$ scale corresponding to forward automobile travel and the negative values to rearward travel. The $R_1$ versus $R_2$ relationship is discontinuous between $R_1$ values of plus one and minus one to provide the hereinbefore-mentioned neutral or re-zero zone, there being no engagement between the driving and driven discs 30 and 32 in the immediate vicinity of the center of the driving disc.

The track generating apparatus 114 includes a shaft 116 rotatable in a support 118, but held against axial movement. The shaft 116 corresponds to the driving shaft 28 for the driving disc 30.

Fixed on the shaft 116 to turn therewith is one arm of an L-shaped frame 120. Pivotally connected to this same arm of the frame 120 for swinging movement about an axis perpendicular to the axis of the shaft 116 is a long rod 122, equal in length to the radius of curvature of the frictionally engageable surface of the driving disc 30. As will be apparent, the rod 122 may be pivoted relative to the frame 120 to vary the angle which it makes with the axis of the shaft 116, such pivoting being effected by any suitable extensible and contractible actuator 124 pivotally connected to the rod 122 and to the other arm of the frame 120.

Fixed on the outer end of the rod 122, and perpendicular to such rod, is a guide 126 for a slide 128. As will be apparent, the slide 128 is movable along the guide 126 in a direction perpendicular to the rod 122 and in the plane of pivotal movement of the rod 122, relative to the frame 120, which is produced by the actuator 124. The slide 128 is moved along the guide 126 by a screw 130 driven by a rotary actuator 132.

Rigidly mounted on the slide 128 and parallel to the rod 122 is a shaft 134 the axis of which corresponds to the axis of the driven shaft 34. As will be apparent, the relative positions of the axes of the shafts 116 and 134, which correspond to the axes of the driving and driven shafts 28 and 34, respectively, and the angle between the axes of these shafts may be varied by means of the actuators 132 and 124. Further, these variations may be combined with turning movement of the frame 138 about the axis of the shaft 140, such turning movement of the frame 138 corresponding to the turning movement of the inner housing 24 within the outer housing 22 by the positioning means 52. On FIG. 9 of the drawings have been marked the contact point 96 between the driving and driven discs 30 and 32 and the radii $R_1$ and $R_2$ of this contact point from the driving and driven shaft axes, corresponding to the positions shown for the frame 138 about the axis of the shaft 140, the rod 122 relative to the axis of the shaft 116, and the axis of the shaft 134 relative to the axis of the shaft 116.

The shaft 134 is encircled by a bearing 136 on a frame 138, this frame being pivotable about the shaft 134, but being held against axial movement relative thereto by the bearing 136. The frame 138 is connected to a fixed shaft 140, mounted on a stationary support 142, by a ball-and-socket joint 144 which is slidable back and forth axially of the shaft 140. The axis of the shaft 140 is below and parallel to the axis of the shaft 116 (not a necessary restriction), the shaft 140 corresponding approximately to the output shaft 36 of the transmission 20. The axially slidable ball-and-socket joint 144 connecting the frame 138 to the shaft 140 corresponds to the hereinbefore-discussed approximate pivoting of the movable housing 24 about a shifting point on the axis of the output shaft 36.

The frame 138 is provided with an arm 146 carrying a cutter 148 for cutting the track 98. Similarly, the frame 138 is provided with an arm 150 carrying a cutter 152 for cutting the track 102. The frame 138 is also provided with another arm, not shown, carrying a cutter, not shown, for cutting the track 100.

In utilizing the track generating apparatus 114, the actuators 124 and 132 are energized in accordance with the desired relation between $R_1$ and $R_2$, such as that shown in FIG. 10, for example. This automatically causes the frames 120 and 138 to assume angular positions such that, for each relation of $R_1$ and $R_2$, the frame 138, which corresponds to the movable housing 24, assumes a unique position about the shaft 140. The frame 138 turns about the shaft 140 through the angle available for turning the movable housing 24 within the outer housing 22. The tracks 98, 100 and 102 are automatically cut or traced as this is done. By then incorporating such tracks in the outer housing 22, the desired $R_1$ versus $R_2$ relation is duplicated as the inner housing 24 is moved by the positioning means 52.

The track generating apparatus 114 may also be utilized to cut the gear segment 110 by means of a gear cutter 154 axially slidable in a support 156 in a direction parallel to the shaft 140. It will be understood that the gear segment 110 is fixed on the frame 138. By moving the gear cutter 154 back and forth along its axis as the frame 138 is moved in generating the tracks 98, 100 and 102, the gear segment 110 is cut with precise correspondence. Thus, the gear segment 110 will mesh properly with the pinion gear 112 upon installation in the transmission 20.

It will be understood that any desired $R_1$ versus $R_2$ relationship may be fed into the track generating apparatus 114 in cutting the tracks 98, 100 and 102 and the gear segment 110, the one shown in FIG. 10 being exemplary only.

CONTROL SYSTEM

*Introduction.*—The foregoing sections of this disclosure describe and explain the operation of most of the components of the transmission 20 proper. The remaining components thereof will be described, and their operation explained, in considering the control system of the invention, which is illustrated diagrammatically in FIGS. 16 and 17 of the drawings.

The control system includes a substantial number of components having somewhat complex interrelationships. In view of this, it is impossible to present a concise over-all description. Consequently, the control system will be considered step by step, breaking the discussion down first into the items controlled by the driver and the control system, then the inputs into the control system by the driver, then the general structure and operation of the control system in conjunction with the transmission 20 (on the basis of legends applied to FIGS. 16 and 17), and, finally, a description of and an explanation of the operation of the components of the control system and related components of the transmission 20 (on the basis of reference numerals applied to FIGS. 16 and 17). In considering each basic component of the control system, and certain related components of the transmission 20, its relation to other components will be explained, instead of trying to explain simultaneously all of the component interrelationships which exist.

In describing the various components of the control system, their locations will be given verbally since such locations are not shown in the diagrammatic views of FIGS. 16 and 17. Many components of the control system, and particularly various valves thereof, may conveniently be located in a single valve housing located adjacent the transmission 20, and preferably mounted on the outer housing 22 thereof. Most of the components of the control system utilize the same hydraulic fluid as that in the inner housing 24 of the transmission 20, suitable connections, not shown in detail, being provided between the inner housing 24 and the aforementioned valve housing, for example.

With the foregoing introduction, the control system of the invention will now be considered in more detail.

CONTROL SYSTEM—CONTROLLED ITEMS

*Introduction.*—The controlled items involved in the transmission 20 and its control system may be considered as viewed from the standpoint of the external, over-all properties of the transmission and of the internal properties thereof. From the external standpoint, the controlled items are simply the engine carburetor throttle and the transmission ratio. From the internal standpoint, the controlled items are the position of the movable housing 24, the normal force between the driving and driven discs 30 and 32, and the throttling of the discharge by the slip pump 40.

The interrelationship of the various controlled items is determined, in part, by the driver of the automobile, who expresses his commands through simple inputs, and is determined, in larger part, by more complex computations and adjustments which are carried out automatically by the control system components. These components are so related as to provide better operating conditions than has heretofore been possible, and to limit their own operation to ranges within the capabilities of the engine, the transmission 20 and the automobile itself.

*Disc contact.*—The ability of the engine to transmit power through the transmission 20 depends primarily upon contact of the two traction discs 30 and 32. Three general modes of operation are controlled and consist of neutral, forward drive and reverse drive. In the neutral mode it is desired that no power be transmitted. Therefore, contact of the discs 30 and 32 is not permitted when the transmission 20 is operating in the neutral mode.

In the forward and reverse drive modes, contact of the discs 30 and 32 is effected only if the relative positions of the discs are such that their contact point 96 is sufficiently distant from the center of the driving disc 30 to prevent damage of the contacting surfaces due to the generation of heat in the contact zone, and, only if the relative speed is below any speed which could cause damage. Therefore, there exist ranges of relative positions for forward drive and reverse drive which are separated by a narrow range in which no contact is permitted. This latter range will hereinafter be referred to as the "re-zero" range. When shifting from either drive range, to the other, the discs 30 and 32 must pass through the re-zero range and are automatically separated while passing through.

*Proportional contact loading.*—In accordance with the laws governing frictional behavior between said bodies, the maximum tractive force which may be transmitted is directly proportional to the force, or load, between the two bodies in direct contact. The contact force acts in a direction normal to the surfaces of both bodies. The tractive force acts in a direction tangent to the surfaces of both bodies at the point of contact.

The control system provides a normal force of a magnitude in direct proportion to the transmitted tractive force, as nearly as possible. When contact is to be effected there is no tractive force because the surfaces are separated. The control system first applies a contact load which is of a magnitude that will provide the minimum tractive effect necessary to overcome the frictional drag of seals, bearings, gears, and the like. It also overcomes the effects of inertia in bringing the various parts up to speed without slippage in the contact zone. The contact force for this minimum tractive effort is hereinafter referred to as "pre-load."

As resistance to turning of the driven shaft 34 is applied, there results a torque which must be overcome by the tractive force acting at its radial distance to the contact point 96 on the driven disc 32. Such torque equals the tractive force times the radial distance $R_2$. Therefore, since various radial distances are employed for various ratios, the relationship of tractive force and torque is dependent upon the transmission ratio also. The control system performs the function of sensing the torque in the driven shaft 34 with hydraulic means and then modifying the hydraulics in relation to the transmission ratio so that for each ratio it produces a contact load signal in proportion to the traction force. At very low signals the contact load increases in addition to the pre-load, because of the mechanism used. When the signal reaches a value corresponding to a contact load slightly greater than the pre-load, then the signal assume complete control of the contact load and varies the contact load in direct proportion to the traction force.

In reverse drive, however, the change of driven disc contact radius would, conveniently, be held to a narrower range than in forward drive because the ratio range would normally be narrower. Also, the portion of service life which would be encountered in reverse operation is small for most applications and a lesser fidelity of contact force to tractive force would be permissible without causing significant reduction in life if the contact force was greater than actually necessary for the tractive force. Therefore, in reverse drive, it is found that simpler controls may be used if the hydraulics are not modified for ratio. It would be a simple matter to provide position sensitive loading in a like manner for any special applications where larger portions of the life are spent in reverse.

*Movable housing.*—As discussed in the description of the mechanism of the transmission 20, the radii to contact on the traction discs 30 and 32 are determined by the relationship of the traction surfaces, the tracks 98, 100 and 102, and the position of the movable housing 24. For a given mechanism, only the position of the movable housing 24 may be varied in actual operation. It is therefore one function of the control system to vary the position of the movable housing 24 so as to effect the proper transmission ratio for all operating conditions. In several of the control circuits to be described, it is necessary to know the position of the movable housing 24. This intelligence is sensed by a mechanical connecting system and is hereinafter referred to as the "position input."

The proper transmission ratio is that ratio which will permit the engine 26 to be operated at the most economical speed at which it will develop the power desired by the operator when it is propelling the automotive vehicle, and is that ratio which will produce a vehicle retarding effect in proportion to the rate that the operator desires to resist vehicle motion when the engine is decelerating the vehicle. It is therefore one function of the control system to adjust the engine carburetor throttle and the transmission ratio in a coordinated variable manner depending upon the power desired and the vehicle speed, when the engine is driving the vehicle. The meaning of a coordinated variable manner will be explained in further discussion. It is another function of the control system to sense the rate at which the operator desires to retard vehicle motion and then to adjust the transmission ratio, by appropriately positioning the movable housing 24, in a downshift direction at a rate in proportion to the desired increase in retarding effort.

*Engine throttle.*—When power is to be developed by the engine, there exists a relationship between throttle setting and engine speed which, if effected, results in the most economical fuel consumption at any power level. It is a function of the control system to adjust the engine speed and throttle setting in accordance with this relationship.

The foregoing relationship may be described briefly as follows. At zero output power the carburetor opening is the minimum which will sustain proper engine idling. Between zero output power and a fraction of the engine maximum power output, the engine speed increases somewhat above its idling speed depending upon the specific engine design while the throttle changes from the minimum opening to full opening. Between the above mentioned fraction of maximum power and the maximum power, the throttle opening remains at its full position while the power developed increases in proportion to engine speed.

At any speed above that which the engine develops maximum power, not only does the power developed decrease but the power is developed with less economy than if it were developed at a lower speed. It is therefore a function of the control system to avoid engine operation above the speed required for maximum power, as will be explained in further discussion.

When power is to be absorbed by the engine and dissipated as heat, as during vehicle deceleration, then the throttle is placed in its minimum power position. This allows the engine to absorb the maximum amount of power.

*Slip pump.*—In either of the drive positions, the transmission ratio cannot reduce entirely to zero because of the effects of heat generation in the contact zone of the discs 30 and 32. This limitation is overcome by the addition of the slip pump 40 on the driven side of the traction discs.

Flow from the slip pump 40 is controlled as one of the functions of the control system. When it is to rotate unresisted, then the flow is passed as freely as possible to the drain, i.e., the fluid common to the inner housing 24 and the control system. When the slip pump 40 is to offer resistance to turning, which is reflected as a reaction for power transmission, then resistance to discharge flow is presented. The transition from unresisted flow to maximum resistance is accomplished in a gradual manner with the aid of a throttling valve. Closure of the throttling valve is coordinated with a slight increase of engine speed above the engine idle speed.

*Limiting output torque.*—Output torque from the transmission 20 is limited so as to prevent damage to the mechanism. The limiting value is necessary because the transmission operates at very low ratios when the vehicle speed is close to zero. At these very low ratios, if the full torque capability of the engine were employed, then the output torque would be very much higher than is needed for vehicle operation. This would necessitate designing the drive train to the vehicle differential to such sizes that the cost to manufacture and the size would be unduly increased. Therefore, if the limiting torque is reached, then a circuit of the control system will act to decrease the throttle opening, thereby reducing the torque developed, and hence the output torque.

*Limiting engine speed.*—Aside from the previously described assurance of better fuel economy if the engine does not exceed its maximum power speed, several other advantages arise from the speed limitation. These advantages are primarily of a protective nature against damage to the engine and transmission 20.

Adequate ratio range exists in the forward drive mode of operation to control the engine speed below the limiting value through the effects of higher ratios. Therefore, provisions are made in the control system to cause a ratio shift up at any time that the engine speed exceeds the limiting value.

In reverse drive, adequate ratio range to limit speed in this manner is not provided, as to do so would unduly require the same ratio range as the forward drive with the attendant greater movement of the movable housing 24. This would increase the transmission size and its manufacturing cost. The control system therefore provides for automatic reduction of the engine carburetor throttle opening at any time that the engine speed exceeds the limiting value.

*Limiting vehicle speed.*—The effectiveness of the transmission 20 to transmit power through a wide range of ratios while the engine is developing maximum power gives rise to the possibility of operating the vehicle at unsafe speeds when the road load is relatively low, as, for instance, in driving down hill. The control system decreases the throttle opening of the engine carburetor whenever the maximum safe speed is attained. This also reduces the maximum speed requirements of which the transmission machinery must be capable.

*Push starting of engine.*—The control system requires that the engine be running and at a proper speed before engagement of the traction discs 30 and 32 is effected for all conditions, except when it is necessary to start the engine from externally caused motion of the vehicle. Such externally caused motion is intended to include towing the vehicle, pushing the vehicle, or permitting the vehicle to descend a grade.

This special section of the control system requires that certain conditions exist before traction disc contact will be permitted. A manual push-start lever must be actuated. The manual drive selection lever must be placed in the forward drive position. The position of the movable housing 24 preferably is such that the discs 30 and 32 will engage at contact radii corresponding to a ratio of about 1:1, or greater. The latter requirement is automatically effected by the push start circuit using power generated by a drive-shaft-driven hydraulic pump. Due to a shift lock mechanism, the drive selection lever must be positioned before vehicle motion attains a very low speed. The push start lever may be actuated at any speed.

CONTROL SYSTEM—INPUTS

*Introduction.*—It is the purpose of this control system to minimize the influence which the vehicle operator must exercise upon the system for its complete functioning. However, there remain certain manipulations of vehicle controls which are left to the driver, as is the case with currently produced automatically controlled vehicle transmissions. These manipulations are hereinafter included in the category of terms denoting "inputs." Although the transmission 20 performs functions of which prior transmissions are incapable, it is an object of the invention to retain the operator actuated controls in as nearly the same fashion as exists for conventional automatic transmissions.

*Starter switch.*—The specific control system embodiment to be described is assumed to be used with a vehicle engine that is electrically started in the conventional manner, utilizing a starter solenoid control switch. The starter switch itself does not constitute a part of the subject control system, but the control system does act to prevent operation of the starter when to do so would result in dangerous performance of the vehicle, or possibly damage the transmission 20. An interrupter of the conventional type is included to prevent operation of the starter when the transmission would be in either of the drive modes upon starting of the engine. Another interrupter is incorporated so as to prevent starting when the vehicle is in motion and moving at a very low speed. The former restriction is imposed to prevent the possibility of unwanted rapid acceleration of the vehicle, and is similar to that incorporated in all currently produced automatic transmissions. The latter restriction is imposed to prevent engagement of the discs 30 and 32 when the driven disc 32 may be turning at a rapid rate due to turning of the propeller or drive shaft which occurs whenever the vehicle is in motion. If the driven disc 32 had attained a high rotational speed, there would be considerable slipping when it contacted the driving disc 30. Such slipping would generate heat in the contact zone and possibly damage the surfaces of the discs.

For this input, then, the operator is required to have the vehicle at rest, or at a very low speed, and to have the transmission in neutral before starting the engine with the electrical starter.

*Drive selection lever.*—The specific embodiment to be described also assumes that a conventional drive range selection or shift lever, or equivalent, is incorporated. The shift lever is intended to be operated manually by the vehicle operator and has three positions, forward drive, neutral and reverse drive. The operator input here is to place the lever in one of these positions for the obvious result.

This input may be changed only when the vehicle is nearly at rest with the engine operating at a speed near its idle speed. This restriction is imposed to protect against possible damage to the traction disc surfaces. It is necessary to insure that the discs 30 and 32 have a low relative velocity whenever they are allowed to initiate contact, as when changing from neutral to forward drive, or when changing from neutral to reverse drive. A change from either of the drive ranges to neutral involves termination of contact and although this would probably not present conditions susceptible to disc damage, a dangerous situation could arise if this change were permitted while the vehicle possessed considerable speed. If the shift lever were accidently moved into neutral at a relatively high speed, then it would be impossible to resume control of the vehicle because of the limitations surrounding initiating contact.

*Vehicle control pedal.*—A foot pedal or lever similar to the foot throttle control lever or accelerator pedal of conventional vehicles is assumed incorporated in the specific embodiment to be described. From all appearances the pedals would be the same. Power transmitted to the vehicle wheels is in both cases controlled by the amount the foot pedal is depressed. However, the actual functioning which results from positioning of the pedal is entirely different.

In its fully released position the foot pedal would command the control system to decelerate the vehicle to nearly a complete stop, if the vehicle is in motion, or to hold the transmission in the lowest possible ratio with the slip pump throttle completely open, if the vehicle is at rest. This command would be followed only if the shift lever is in either of the drive ranges. When placed in neutral, all flow needed to effect the command is cut off. The operator input to issue this command is to insure that the foot pedal is not depressed.

Partial depression of the foot pedal eliminates the deceleration command and issues a drive command. This command functions to activate the drive circuit of the control system immediately after deactivating the deceleration circuit. Because of the mechanism connected to the foot pedal linkage, a sharp difference in the force required to move the pedal occurs when the deceleration command is eliminated. Only a light force on the pedal would be necessary to move it from the position of full release to the partial depression position corresponding to issuing the drive command. Greater force would be necessary to depress the pedal further, even though this greater force would still be of the same magnitude required for the foot throttle in conventional vehicles. The operator input to change from the deceleration command to the drive command would be to depress the pedal until it reached a point offering a sharp increase in resistance to further movement.

Between the aforementioned partial depression and the fullest depression position the actual power generated by the engine increases with the amount of depression. (In a conventional vehicle the engine throttle opening and not the actual power, which is a function of engine speed and throttle opening, increases with foot lever depression.) This functions to control both the engine throttle opening and the engine speed in a coordinated variable manner. From zero power to a fraction of maximum engine power, the throttle opening increases in proportion to the foot lever depression. During this interval, the transmission varies its ratio as needed to operate the engine at the optimum fuel consumption speed for each throttle setting, regardless of the vehicle load or speed. The first small increase in engine speed is used to generate a signal for gradually actuating closure of the outlet of the slip pump 40. The transmission ratio possesses the ability to control the engine speed through its ability to reflect the torque in the drive train at any torque value within wide limits, to the engine. If the reflected torque is below the torque generated by the engine, then the engine will have sufficient torque to accelerate. If the rflected torque is above the torque being generated by the engine, then the engine will slow down.

For power requirements above a fraction of maximum power, the engine throttle opening is held in its wide open position while motion of the foot lever or pedal dictates the engine speed. The transmission ratio automatically changes to control the engine at this speed by reflecting the torque in the drive train as described above. It should be mentioned that the control section performing this function does not relate the foot lever to any specific ratio, but simply determines when the ratio should be changed and whether the change should increase the ratio, and thus the reflected torque, or should decrease the ratio, and thus lower the reflected torque.

The operator input to control power is simply to control the position of the foot lever in relation to the power he desires the engine to produce, which is the normal driver reaction.

*Brake pedal.*—The specific embodiment to be described assumes that the vehicle is equipped with a conventional hydraulic brake system which is actuated by the efforts of the vehicle operator acting on a foot pedal, or equivalent. It is a property of this type of brake system that the pressure developed is a function of the amount the operator desires the vehicle to be retarded, or decelerated. The control uses the brake pressure to determine the rate at which the transmission will be down shifted to aid in slowing the vehicle. However, the control will interrupt down shifting if the vehicle is traveling at such a speed, hereinafter referred to as the deceleration threshold speed, that further downshifting might cause the engine to operate at an excessive speed. This interruption will normally occur much before excessive engine speed is reached in an effort to reduce objectionable engine noise when decelerating conditions are normal. This simply requires that the brake system supply all additional retarding effort. However, a higher speed with the resultant increase in engine noise is permitted when abnormally rapid deceleration is desired, as sensed from a higher brake system pressure.

The operator input is to apply the brakes with greater effort whenever he desires that the engine produce more effort to retard vehicle motion, which is the normal driver reaction.

*Push start lever.*—Operator input for effecting a start from externally forced vehicle motion is to place the range selection or shift lever in the forward drive position while the vehicle is at rest, and then to pull a handle, or equivalent, between the time the vehicle is at rest and the time that the engine will engage. If the engine starts then the operator is at liberty to operate the vehicle as would normally be permissible while driving. However, if the engine fails to generate power, then the operator may exert considerable influence over the transmission ratio by operating the vehicle control pedal. The range of transmission ratios through which the vehicle control pedal may exert influence is also dependent upon the vehicle speed. This will be more fully explained under the section on operation. The operator input for exerting the influence is to adjust the position of the vehicle control pedal.

*Optional parking gear.*—The specific transmission 20 described does not incorporate a parking gear as used on conventional automatic transmissions, but one can be added if desired. If it were added it would require an operator input to actuate it and would be actuable only when the vehicle is at rest.

*Optional maximum ratio limiter.*—With the control system hereinafter described, it is not possible to maintain the transmission 20 at a constant ratio during deceleration unless the vehicle is above the threshold speed. At that speed, the constant ratio is of the magnitude of 1:1.

During the descent of abnormally steep grades which are of considerable length, and when it is desired to travel over them at nearly constant speed with the engine retarding acceleration, it would be necessary for the vehicle operator to constantly change from the vehicle control pedal to the brake pedal, as during deceleration there is normally a constant flow to cause downshifting. This may be overcome by the addition of a limiting valve which would prevent the transmission from shifting above a maximum ratio. The operator would then only have to select the maximum ratio and then hold the vehicle control pedal at the minimum drive position. When he desires to increase the retarding force he would simply release the pedal. When he again desires to return to the selected maximum ratio, he would simply slightly depress the vehicle control pedal. A blocking type upshift interrupter could then be adjusted so as to increase the maximum operating ratio during driving, but if it were adjusted to a lower ratio while driving, then it would be necessary to lower the ratio by the deceleration circuit before it would be effective.

CONTROL SYSTEM—GENERAL OPERATION

*Introduction.*—Most of the operation of the control system is explainable by considering the three general modes of operation of forward drive, neutral and reverse drive. However, there are some minor operations which are transitionary and do not fit wholly into any of the general modes. The most significant minor operation is the starting of the vehicle engine. Therefore, a separte mode of operation is included to cover engine starting.

*Engine starting.*—Power for starting the vehicle engine is normally supplied by an electrical battery. Whenever the battery is incapable of starting the engine due to either its own or engine malfunctioning, then the engine may be started by using energy which forces vehicle motion.

*Battery powered start.*—Two starter circuit interrupters dictate conditions which must be satisfied before a battery powered start may be effected. An interrupter actuated by the shift lever mechanism dictates that the shift lever be in the neutral position prior to energizing the starter motor. Another interrupter on a shift-lock-and-starter-interrupter valve to be described dictates that the vehicle be either at rest, or moving at a very low speed, prior to energizing the starter motor.

During the start the operator may exercise complete control over the engine throttle by actuation of the vehicle control pedal, and the automatic or manual choke may function in the conventional manner.

Normally after the engine is self sustaining, it increases speed because the operator holds the vehicle control pedal depressed and because of the conventional action of an automatic choke. The speed level is then considerably above the normal engine idling speed and the shift-lock-and-starter-interrupter valve is actuated by the pressure signal across an engine-speed-variable orifice and prevents shifting from neutral to one of the drive positions, by jamming a pin into a slot on the shift lever linkage.

Engine speed decreases when the operator releases the vehicle control pedal and when the engine is sufficiently warm to permit driving. The shift lock then releases and permits a shift into either of the drive positions. Under abnormally cold starting conditions the engine may be held at a speed considerably above its normal idling speed by the action of the automatic choke. The amount of speed in excess of the normal idling speed which will be tolerated without a shift lock is dependent upon the design of the shift-lock-and-starter-interrupter valve. It is apparent that the design may also include an engine temperature sensitive mechanism to allow shifting at higher speeds when the temperature is unusually low.

*Externally forced start.*—Prior to permitting vehicle motion in preparation for a push start, the drive range selector lever must be placed in the forward drive range. Starting with this method may be accomplished only if the vehicle is moved in the forward direction. Placement in the forward range must be accomplished while the vehicle is at a standstill or while it is moving at a very low speed. Otherwise, power from a drive-shaft-driven pump to be described is directed to an override section of the shift-lock-and-starter-interrupter valve and jams the shift lever against movement when the vehicle attains speed. At rest, or at any speed, the operator actuates a push start lever to actuate a push-start-command switch, which energizes a push-start-shift-up switch, all of which will be described hereinafter.

Prior to a push start, the transmission ratio is normally at the lowest possible ratio in either forward or reverse because these are the positions which result from bringing the vehicle to rest after it has been in motion. Engagement of the traction discs 30 and 32 is prevented until the transmission ratio has been shifted automatically from either of these positions up to a ratio of 1:1 or greater. Such a shift up is accomplished by directing all hydraulic power generated by the drive-shaft-driven pump when motion occurs to the shift up side of a ratio control motor, through the push-start-shift-up switch. When the proper ratio has been attained, the push-start-shift-up switch redirects the hydraulic power to cause contact of the traction discs 30 and 32 by actuation of the pre-load mechanism, and insures the ability to transmit power through the transmission by simultaneously blocking the outlet of the slip pump 40.

Upon contact of the discs 30 and 32 the engine is forced to rotate, which also rotates the engine driven pump and supplies power for the normal operation of the control after it automatically switches the push-start-command switch to the off position. Until the engine commences normal power development, however, the influence of the vehicle control pedal over the transmission ratio results in somewhat different behavior. Such behavior is dependent upon whether the vehicle speed is above the deceleration rate threshold value, or below it.

If the vehicle speed is below the threshold value, the following relationships will exist betwen the vehicle control pedal and the transmission ratio:

(a) If the control pedal is not depressed at all, then the ratio is reduced to lower values through the influence of the deceleration circuit.

(b) If fully depressed, then the ratio is rapidly reduced, through the influence of the drive circuit, which seeks a sufficiently low ratio to allow the engine to speed up. The engine is incapable of speeding up since it hasn't started and therefore even lower ratios are sought.

(c) If depressed just sufficiently to switch from the deceleration circuit to the drive circuit, then the ratio increases in an attempt to seek a ratio which will slow the engine down. Being unable to attain such a ratio, the system continues to raise the ratio up to the maximum overdrive ratio of the transmission 20.

(d) If depressed slightly more than in (c) above, then the ratio still increases and for the same reason.

(e) Depending upon the vehicle speed, the same result of (d) above exists up to a point at which the engine speed is proper for the vehicle speed for conditions where the engine is powering the vehicle, and the transmission ratio will not change.

(f) Pedal depression beyond that in (e) above results in lowering of the ratio for the same reasons given in (b) above.

If the vehicle speed is above the threshold value, and if the vehicle control pedal is not depressed at all, the transmission ratio holds at the value of 1:1 as dictated by the interruption on the deceleration circuit when the speed is above the threshold value. In all other respects, the operation is the same as set forth in (b) to (f) above.

From the above it may be seen that the operator is at liberty to utilize the transmission to adapt to the properties of the externally applied forces.

If, however, it is found that operation in this manner is too complicated for vehicle operators, it would be possible to restrict the control system from entering the deceleration method of operation by putting a manually actuated blocking valve upstream from the deceleration valves. Also, an automatic control could be incorporated to allow the vehicle control pedal to control only the throttle, eliminating its effects on transmission ratio, until a torque reversal is sensed at the slip pump 40 which indicates that the engine is powering the vehicle and is ready to be operated in a normal manner. This would involve manually blocking both the drive and decelerate circuits and then automatically releasing them when pressure exists in the opposite slip pump port. This would result in the most simple arrrangement, but would not have the flexibility that the preferred mode outlined possesses.

*Neutral.*—A shift into neutral may be effected only when the vehicle is at rest, or moving at a very low speed, and when the enegine is at a speed less than slightly above normal engine idle speed. If the engine is above this speed, the pressure signal across the engine-speed-variable orifice causes the shift-lock-and-starter-interrupter valve to actuate and jam against shifting. If the vehicle is above a very low speed, the drive-shaft-driven pump causes flow to also actuate the jamming mechanism.

The shift lever in the neutral position causes an override section of a neutral switch to port flow from the engine driven pump to drain, rather than to the drive and the decelerate circuits. It also provides a path for draining of the loader actuator which insures that neither pre-load, nor load from the proportional loader circuit, may be applied. This assures that the discs 30 and 32 cannot be made to contact, which in turn assures that engine power or drive shaft power cannot be transmitted through the transmission. Even the re-zero circuit is inactive as there is no pressure build up on the downstream side of the engine-speed-variable orifice due to the opening in the neutral switch.

In neutral, the only part of the circuit which operates effectively from flow from the engine driven pump is the engine-speed-variable orifice and the shift-lock-and-starter-interrupter valve.

Components which do not rely on the flow from the engine driven pump, but which work effectively, include the vehicle control pedal (for the engine throttle opening effect only) and the drive-shaft-driven pump (if the vehicle is in motion).

When the engine is not running and the transmission 20 is in neutral, only the drive-shaft-driven pump and the shift-lock-and-starter interrupter valve are operative, and they operate only if the vehicle is in motion.

Because of the above, the normal or conventional requirements of a neutral drive position are attained. The vehicle may be moved by external forces for relocation with or without the engine running. The engine may be run at any speed below its limiting speed for the purpose of warming up or for maintenance adjustments. Engine starting may be attained in neutral using battery power, as previously described.

The main difference from conventional transmissions in neutral is that the subject transmission cannot be shifted from neutral to a drive gear while the engine is much above its idle speed, or if the vehicle is moving at more than a slow speed.

*Forward drive.*—Forward drive is intended for movement of the vehicel in the forward direction with the engine running. However, the vehicle may be moved in the forward direction without the engine running, but no power can be transmitted through the transmission except when push starting as previously described.

*Shifting.*—Shifting from either neutral or reverse drive to forward drive requires that the engine be near its normal idle speed and that the vehicle be nearly at rest. Otherwise the shift lever will be jammed as previously described. In reverse drive, the movable housing is positioned at the lowest possible reverse drive ratio when the vehicle is brought to a halt. Before forward drive is effected in response to shift lever repositioning, the re-zero circuit acting mainly through a ratio range switch, FIG. 17, supplies flow to move the movable housing 24 from its lowest possible reverse ratio to the lowest possible forward ratio. Upon attaining this position, the normal drive and decelerate circuits are activated and the re-zero circuit closed. Also, as soon as the re-zero circuit is activated in response to the shift lever repositioning, the load between the discs 30 and 32 is eliminated by draining the loader actuator chambers through a drive-decelerate switch, FIG. 16. As soon as the re-zero circuit is closed then the pre-load is again applied. The shift is then considered complete.

*Accelerating.*—When the pre-load is applied, no power is transmitted through the transmission 20 because the output shaft 36 is at rest and the slip pump outlet is fully opened. There is, however, some torque in the output shaft 36, similar to the creep torque of conventional automatic transmissions, which results from a reflection of the drag torque of allowing the planetary differential 42 and the slip pump 40 to turn. If desired, the tendency to move the car from this drag torque could be overcome by application of the brakes as is usually done with the conventional automatic transmissions.

To accelerate, the driver depresses the vehicle control pedal in proportion to the amount of power that he desires applied. The first portion of the pedal movement simply allows the drive-decelerate switch to change to the drive position, which activates a ratio change determiner, FIG. 16. Further depression moves the engine carburetor throttle and a power selector cam, FIG. 16, in a relationship determined by their mechanical linkage.

During the initial portion of movement of the engine carburetor throttle, the engine speed starts to increase and as it does a pressure signal is developed across the engine-speed-variable orifice. This pressure signal is applied to the slip pump throttle to cause the throttle to gradually close so that when the engine attains slightly above its normal idle speed, complete blocking of flow from the slip pump is effected. This pressure signal also causes actuation of the shift-lock-and-starter-interrupter valve at a very small increase in engine speed. Application of the pressure signal to the ratio change determiner varies the length of a concentric spool member thereof, to be described, in direct relation to the engine speed throughout the entire engine speed range.

The power selector cam issues a signal to the ratio change determiner which dictates what the engine speed should be to generate the amount of power corresponding to the position of the vehicle control pedal. The ratio change determiner will issue flow to raise the ratio when the engine speed exceeds the dictated value, or will issue flow to lower the ratio if the engine speed is below the dictated value. Both of these flows pass through a reverse switch, FIG. 16, which directs each flow to the proper portion of the ratio range switch. This switch allows the flow to pass only if the change in ratio would still result in the movable housing 24 being positioned within the allowable range of positions provided for forward drive. When the movable housing 24 is in the position corresponding to the maximum allowable ratio, the ratio range switch blocks all flow tending to raise the ratio. Likewise, when the movable housing 24 is in the position corresponding to the minimum allowable ratio, the ratio range switch blocks all flow tending to lower the ratio.

Operation of the proportional loader circuit throughout acceleration is as previously described.

Vehicle motion causes the drive-shaft-driven pump to operate, which also tends to actuate the shift-lock-and-starter-interrupter valve. It also supplies a vehicle speed signal to a high-speed-deceleration switch, FIG. 17, but since the deceleration circuit is inactive its effects are redundant.

*Maintaining speed.*—Maintaining speed as in highway driving requires that the output shaft 36 be at nearly constant speed and that power in proportion to the road load be developed. In contrast to conventional transmissions, which necessitate that the engine likewise be run at nearly constant speed and power varied with throttle opening, the engine will vary speed in relation to the power requirements and will be controlled through a combination of adjusting throttle position and transmission ratio for very low power requirements, and by adjusting the ratio alone while the engine operates at full throttle for greater power.

The desire for greater power is sensed by a further depression of the vehicle control pedal. Less power is sensed by partial release of the pedal. In the manner previously described, the ratio change determiner will vary the transmission ratio to allow the engine to increase speed for greater power and to cause it to decrease speed for less power. The previously mentioned limitations on ratio range also apply to maintaining speed. Therefore, if at the maximum ratio and full throttle, the power developed by the engine is greater than the road load, the throttle opening decreases in proportion to the release of the vehicle control pedal so that the power developed equals the road load.

Deceleration is commanded when the operator fully releases the vehicle control pedal. This immediately causes a reversal in the direction of transmitted torque as the rear wheels then tend to drive the engine. Torque reversal causes the slip pump 40 to turn the opposite direction, but because of the check valve system shown in FIG. 17 the same lines leading to the proportional contact loading system remain the pressurized lines. Therefore, the normal force is still applied in proportion to the torque without regard to torque direction. At one point during the reversal, the torque is equal to zero but considerable normal force is still effected. This results from having a relatively slow drainback of fluid already in the loader actuator and from maintaining the pre-load cylinder unchanged.

Release of the vehicle control pedal also immediately causes the drive-decelerate switch to change from directing flow for the drive circuit to directing flow for the deceleration circuit. Specifically, flow is blocked to the ratio change determiner and is directed to a deceleration-downshift-rate selector, FIG. 17.

Subsequent occurrences are dependent upon the existing transmission ratio, the vehicle speed, and the pressure in the vehicle brake system. A downshift rate is determined by a portion of a deceleration-downshift-rate selector, FIG. 17, nearest the brake pressure input end thereof. A normal rate is effected by the flow through a metering orifice. The rate is increased in proportion to brake system pressure. Two interrupters must be passed before the rate will be permitted to downshift the transmission. If the vehicle speed is low, the flow is permitted to essentially bypass the interrupters as effected by permitting flow directly through the high-speed-deceleration switch to the downshift side of a ratio control motor, FIG. 17, through the reverse switch and through the ratio range switch.

If the vehicle speed is high, above the threshold speed, then the high-speed-deceleration switch directs the downshift flow back to the lower portion of the deceleration-downshift-rate selector, where flow will be permitted dependent upon the existing transmission ratio and upon brake system pressure. If the transmission ratio is above 1:1, the downshift flow is permitted. If it is below 1:1, the downshift flow will be blocked unless considerable brake pressure is applied. Under this condition the ratio is allowed to reduce to a value slightly below 1:1 before the flow is blocked. The vehicle is slowed by the combination of brake and engine retarding forces with the transmission ratio limited against further downshift until the vehicle speed drops below the threshold value. From then on the flow bypasses the high-speed-deceleration switch and downshifts the transmission with the resultant increase in vehicle retardment. When the ratio reduces to the minimum possible forward ratio, the ratio range switch blocks further flow. When the engine speed decreases sufficiently, the slip pump throttle gradually begins to open with any further reduction in engine speed. The remainder of deceleration is dependent upon application of the vehicle brakes alone. This sets the transmission to the proper conditions for initiating another acceleration cycle or for shifting to either neutral or reverse as may be selected by the vehicle operator.

*Reverse drive.*—The engine may not be started from either battery power or from vehicle motion when the drive selector lever is in the reverse drive position. The selector lever may be moved into reverse drive only if the engine speed is below the aforementioned speed which actuates the shift-lock-and-starter-interrupter valve, and the vehicle speed is below the aforementioned speed which also actuates the shift lock. The control system is changed into the reverse mode of operation by switching the reverse switch, which is done automatically when the selector lever is positioned.

Shifting of the reverse switch redirects raise-ratio, lower-ratio, and re-zero flows to different ports on the ratio range switch. The redirected re-zero flow immediately closes both the drive and decelerate circuits and begins to move the movable housing 24 to the lowest permissible reverse ratio from the lowest permissible forward ratio. The closure of the drive and decelerate circuits is accompanied with a release of fluid from the loader actuator 44 through the drive-decelerate switch, thereby eliminating disc contact.

When the movable housing 24 has been properly positioned, the re-zero flow is closed by the ratio range switch and the drive-decelerate switch resumes normal operation. This normal operation again results in the application of pre-load. Thus, the discs 30 and 32 are in contact and at the proper ratio to operate in the same manner as described for forward drive acceleration, speed maintenance and deceleration. The maximum ratio in reverse is considerably less than the maximum ratio in forward drive. Also, the proportional contact loading is somewhat different in that pressure from the slip pump 40 is not adjusted for the position of the movable housing 24, but utilizes the full slip pump pressure in the loader actuator 44.

Shifting from reverse drive to neutral, or to forward drive, is accomplished with movement of the drive range selector lever when the engine and vehicle are below the previously mentioned speeds.

CONTROL SYSTEM—COMPONENT DESCRIPTION

*Introduction.*—The following sections described in more detail the structure and operation of the various control components. The individual components and lines have been shown in FIGS. 16 and 17 of the drawings as separate elements. However, as previously mentioned, most of the valves may be housed as one integral assembly with their fluid connections likewise integrated to the valve housing. Some of the other valves may be integral with their related components, e.g., pump check valves may be integral with the pumps. For convenience, all drain ports have been shown in FIGS. 16 and 17 simply as openings which are to be understood as opening into the main valve body or housing, which is filled with fluid.

The following individual component descriptions give the purpose, structure or type, location and operation of exemplary components. For convenience, these component descriptions will be presented more or less in outline form.

*Engine driven pump 160*

*Purpose.*—To supply fluid power at a flow rate in direct proportion to engine speed and at any pressure required for operation of the control system.

*Structure.*—A positive, fixed displacement pump of one of the well-known types, e.g., piston, gear, vane and roller pumps.

*Location.*—Mounted on either the engine 26 or the transmission 20, or any other suitable location for shaft driving from the engine.

*Engine-speed-variable orifice 162*

*Purpose.*—To provide a variable resistance to flow from the engine driven pump 160 such that the pressure drop across the resistance will be a function of the engine speed; and To open a port and direct flow to the engine throttle decreaser 164 when the engine speed exceeds the value corresponding to maximum power.

*Structure.*—Spring loaded spool valve 162 with a conical hole 166 abutting a large needle 168 at variable distances, and including a stepped diameter spool 170 permitting flow through ports 172 when shifted axially.

*Location.*—Main valve body.

*Operation.*—Fluid from the engine-driven-pump 160 enters the valve 162 at the end with the valve needle 168. Pressure acts on the corresponding spool end, causing the spool 170 to move axially against opposition provided by a spring 174 acting on the opposite end of the spool. Axial movement of the spool 170 increases the opening between the valve needle 168 and the conical hole 166, providing a larger opening for passage of the fluid. In this manner, the pressure across the valve 162 increases with flow, but at a rate less than that which would exist for a fixed orifice. When the pressure across the spool 170 increases sufficiently to move the spool sufficiently to open the ports 172, flow is directed to the engine throttle decreaser 164.

Shift-lock-and-starter-interrupter valve 176

*Purpose.*—To prevent drive selection range shifting and operation of the engine starter when to do so would result in damage to the traction discs 30 and 32.

*Structure.*—Spring loaded dual spools 178 and 180 with actuating pin 182 and electrical contact breaker (starter interrupter) 184.

*Location.*—Main valve body adjacent the shift lever 186.

*Operation with input from engine speed pressure signal.*—The engine speed pressure signal is applied across the spool 178 with the integral pin 182 and acts in opposition to the resistance of the spring 188 shown. When the engine speed signal attains a value corresponding to slightly above normal engine idle speed then the spool 178 moves, compressing the spring and inserting the pin 182 into a slot on the shift lever 186. The shift lever 186 then cannot move without shearing the pin 182. Advancement of the pin 182 also causes the pin to contact an actuation button on the electrical contact interrupter 184, thereby opening the starter solenoid circuit and preventing energizing of the starter circuit.

*Operation with input from drive-shaft-driven- pump 190.*—Pressure from the drive-shaft-driven pump 190 acts directly on the end of the free spool 180. Movement of the free spool 180 is transmitted to the integral pin spool 178 by contact of the spool 180 and the pin 182. This causes the two spools and the pin to move against the force of the spring 188 and to effect circuit interruption and shift lever locking in the manner described above.

Slip pump throttle 192

*Purpose.*—To control flow from the slip pump 40 in relation to engine speed for speeds slightly above normal engine idling speed, and to block flow at the proper time during a push start.

*Type.*—Dual controlled flow throttle valve with dual spools 194 and 196 and hydraulic override by free spool 194.

*Location.*—Integral to main valve body or case.

*Operation with input from engine speed pressure signal.*—The engine speed differential pressure acts across the ends of the throttle spool 196 which is tapered in the spool passage. Flow from the slip pump 40 entering one annular port proceeds through the spool passage and exits to the main valve case at 198. The flow is either free to pass to the case, or is throttled in relation to the spool position. At normal engine idle speed, the spool 196 is held so as to pass flow to the case freely, due to the force from the bias spring 200. As engine speed increases, the pressure difference increases and begins to overcome the efforts of the spring 200. The tapered diameter then begins to gradually restrict the flow and continues to do so until the spring bottoms and the port 198 is completely blocked. Further increase in engine speed simply holds this position more firmly.

*Operation with input from push-start-shift-up switch 202.*—When flow is directed from the push-start-shift-up switch 202, it acts on one end of the free spool 194. There would be no pressure in the throttle spool chamber as the engine would not be running. The flow would cause the free spool 194 to move into contact with the throttle spool 196 and then move the throttle spool to the blocked flow position against the spring resistance.

The free spool 194 holds the throttle spool in the blocked position when the push start circuit is deactivated, but the spool 194 has a loose fit in the housing so that the fluid holding it gradually drains, and because speed signal pressure would then be applied the free spool would be restored to its original position.

Excess torque switch 204

*Purpose.*—To insure that excessive engine driving torque is not transmitted through the transmission 20.

*Type.*—Pressure switch or valve with free passage junction.

*Location.*—Integral to main valve body.

*Operation.*—Pressure from the slip pump 40 is directed to one end of a spool 206 at all times. The valve 204 is held closed by the force of a spring 208 acting on the opposite end. When the force due to the pressure exceeds the spring force, flow is permitted to pass from the slip pump 40, through the engine-speed-variable orifice 162 to the engine throttle decreaser 164.

Torque decreases with the closure of the engine throttle 210 and the slip pump pressure follows. When the torque has decreased sufficiently, the spool 206 reseats.

Engine throttle decreaser 164

*Purpose.*—To reduce power generated by the engine to protect against excessive engine speed, vehicle speed, and transmitted torque; and To restrict too rapid movement of the throttle linkage 212.

*Type.*—A hydraulically damped, rotary vane hydraulic actuator with linkage levers 213.

*Location.*—Adjacent to main valve body.

*Operation.*—When the throttle 210 is closed completely, an actuator vane 214 is in the position shown and the actuator chamber is full of fluid. As the throttle 212 is applied the levers 213 and vane 214 move clockwise. Fluid in the chamber is forced out through the left orifice 216. Resistance to this flow prevents too rapid throttle opening. During this movement, fluid enters the chamber on the opposite side of the vane through the orifice 218 on the right side. If the carburetor throttle opening is decreased, fluid is forced out the orifice 218 and enters the opposite chamber through the orifice 216.

However, if at any time either excessive engine speed, transmitted torque, or vehicle speed, exists, flow from the respective sensing units is directed to force the vane 214 and levers 213 to move counterclockwise with a resultant decrease in engine throttle opening.

When flow no longer occurs from the sensing units, pressure holding the vane 214 decays due to flow through the orifice 216, thus restoring the decreaser 164 to its original state.

Neutral switch and pressure regulator 220

*Purpose.*—To effect neutral conditions on necessary components by switching or draining;

To direct flow to necessary forward and reverse circuits; and

To control fluid pressure at a constant value for forward and reverse circuits while bypassing excessive flow from engine driven pump 160.

*Type.*—Dual controlled, spring biased, spool valve 222 with mechanical override actuating pin 224.

*Location.*—Integral to main valve body.

*Operation in forward and reverse.*—In the position shown, the valve or valve spool 222 is where it would be for either forward or reverse drive and with the engine driven pump 160 pumping more flow than is needed for circuit operation.

Flow enters the valve from the engine-speed-variable orifice 162 and is split with part to the drive-decelerate switch 226 and part to drain at 228.

Signal pressure in the drive-decelerate line 230 is directed to the end opposite the bias spring 232. This causes the spool 222 to move against spring resistance and open the drain port 228 when pressure exceeds a prescribed value. When the pressure is below the prescribed value, the spring 232 allows only the port to the drive-decelerate switch 226 to be open. In this manner pressure is regulated to the prescribed value. Signal pressure is unable to move the spool 222 sufficiently to open the port 234 nearest the bias spring 232 since before this could happen all flow would be directed to the drain.

*Operation in neutral.*—When the shift lever 186 moves to the neutral position, the mechanical override pin 224 forces the spool 222, against spring resistance, to a position which passes both the engine driven pump 160 flow and the loader actuator 44 pre-load flow to drain, through separate ports 228 and 236. The drive-decelerate circuits are thereby deactivated as is the loader actuator 44, resulting in the conditions necessary for neutral.

When the shift lever 186 moves from the neutral position to forward drive, the spool 222 is restored to its pressure regulating mode by the spring 232. Further movement of the shift lever 186 into reverse drive simply separates the shift lever and the override pin 224, leaving the valve to operate the same as it does in forward drive.

*Inlet-outlet checks 238 for slip pump 40*

*Purpose and operation in forward drive.*—To permit the slip pump 40 to pump fluid to the hydraulic circuit when the engine is driving and to permit it to pick up fluid from the main valve case or reservoir when the engine is retarding.

*Purpose and operation in reverse drive.*—To permit the slip pump 40 to pump fluid to the hydraulic circuit when the engine is retarding and to permit it to pick up fluid from the case when the engine is driving.

*Type.*—Two conventional spring loaded check valves, generally designated 238.

*Location.*—Integral to main valve body.

*Position-proportional pressure generator 240*

*Purpose in forward drive.*—To provide a pressure signal which is directly proportional to the traction force between the discs 30 and 32 by making the signal proportional to the slip pump pressure and modifying it as a function of the contact radius of the driven disc 32.

*Purpose in reverse drive.*—To provide a pressure signal equal to the slip pump pressure.

*Type.*—Mechanically controlled valve having two spools 242 and 244 in which one spool 244 is helically grooved and the housing provides a downstream pressure tap 246.

*Location.*—Integral to main valve body.

*Operation in forward drive.*—Pressurized fluid from the slip pump 40 is admitted at one end of the valve body. The helically grooved spool 244 is controlled as a function of the movable housing position. Flow occurs through the helical groove of the spool 244 and around the spool to the opposite valve body end. Pressure at the upstream spool end is equal to the full slip pump pressure. Pressure at the downstream valve body end is equal to case pressure. Pressure between these two points varies linearly with the distance from the upstream end, for a uniform helical groove, but may be made to decrease as any function of distance with a nonuniform groove.

The pressure tap 246 is placed at a fixed position in the valve body and picks up varying proportions of the slip pump pressure in any prescribed fixed relationship to the driven traction disc contact radius $R_2$ as a function of the movable housing position.

When the contact radius $R_2$ is relatively large, as at very low forward ratios, torque is large for a given traction force and a smaller portion of the slip pump pressure is required to operate the loader actuator 44. This smaller portion is attained by having relatively high flow resistance upstream from the pressure tap 246 as occurs when the spool is more retracted into the valve body.

When the contact radius $R_2$ is relatively small, as for very high forward ratios, then torque is small for a given traction force and a larger portion of the slip pump pressure is required to operate the loading mechanism.

*Operation in reverse drive.*—Movement into reverse causes the position input to move the grooved spool 244 further into the valve body to such a position that prongs on the end of the spool engage the spool 242 and force it away from a stop 248 against the action of a spring 250, thus opening a previously closed port 252. For all positions in reverse, this port remains open.

With the port 252 open, full fluid pressure from the slip pump 40 bypasses the grooved spool 244 and is issued directly to the load pressure regulator 254 through the line 256. Because of this, the loader actuator 44 is made insensitive to movable housing position in reverse.

When the grooved spool 244 resumes a position corresponding to forward drive, the prongs withdrawn along with the spool 244 and the spring 250 forces the spool 242 to move against the stop 248, thus again blocking the port 252.

The basic value of varying the normal disc force with the transmitted load is to allow operation of the discs 30 and 32 and the transmission bearings at loads well below the maximum values for as much of the mechanism life as possible and to allow operation at better efficiency. The proportion of time that the vehicle is operated in reverse would not be worth the additional equipment necessary to adjust the slip pump pressure as a function of the reverse ratio. It should be understood that if the application required larger portions of time in reverse, the equipment could be designed to adjust for the reverse ratio also.

*Linkage telescoper 258*

*Purpose.*—To allow the vehicle control pedal 260 and associated linkage 212 to move the engine carburetor throttle 210 throughout a portion of its movement, but to allow the pedal and linkage to continue their motion when the engine throttle and the throttle decreaser 164 are stopped at their extreme positions.

*Type.*—All mechanical spring positioned linkage with bidirectional axial telescoping, as shown in U.S. Patent No. 2,071,785, Ehrlich.

*Location.*—Between the exterior levers of the engine throttle decreaser 164 and the power selector cam 264.

*Operation during deceleration.*—When the vehicle control pedal 260 is in its fully released position, an exterior lever 262 of the power selector cam 264 is in the position shown. The internal link 265 in the telescoper 258 is held in position by an engine carburetor throttle stop 266 and the effort of the spring 268. The engine may then be idling and the drive-decelerate switch 226 is in the decelerate position as forced by the power selector cam 264.

*Operation at part throttle.*—When the vehicle control pedal 260 is slightly depressed, the external lever 262 on the power selector cam 264 moves clockwise, dragging the housing portion 270 of the linkage telescoper 258 with it. The compressed spring 268 begins to extend and continues to extend until an insert 272 reaches and engages a ring 274 which is held in position by the housing members 270 and 276. The internal link 265 of the telescoper 258 is made with a disc 278 on its end. The diameter of the disc 278 is such that it will pass freely through the ring 274.

Further movement in this direction is transmitted to the internal link 265 because it is held in position by both adjacent springs 268 and 280 with sufficient force to overcome linkage resistance. This causes the engine carburetor throttle to follow movement of the vehicle control pedal 260, thus increasing the throttle opening, until the throttle 210 contacts a stop, not shown. Thus, within a prescribed range, partial throttle openings are proportional to vehicle control pedal position.

*Operation at full throttle.*—Further depression of the vehicle control pedal 260 cannot cause further motion of the engine throttle decreaser lever 213 because of the stop engagement. Necessary extension of the linkage telescoper 258 is provided by the action of the internal link disc 278 and compression of the other spring 280. Thus, throughout further depression of the vehicle control pedal 260, the engine carburetor throttle 210 is held in its fully opened position.

*Loader pressure regulator 254*

*Purpose in forward and reverse drive.*—To compare pressure in the loader actuator 44 to signal pressure from the position-proportional pressure generator 240, and then, if the loader actuator pressure is found too low to permit fluid to flow from the slip pump 40 into the loader actuator 44, to raise the pressure, or, if found too high, to permit fluid from the loader actuator to flow to drain until the pressure lowers to the signal pressure.

*Purpose in neutral.*—To permit all loader actuator fluid to drain and to prevent flow from the slip pump 40 to the loader actuator 44.

*Type.*—Hydraulically actuated spool 282 with a mechanical override by a hydraulically actuated piston 286.

*Location.*—Integral to main valve body.

*Operation in forward and reverse drive.*—A pin 284 attached to a pre-load piston 286 in the loader pressure regulator 254 is in the position shown whenever the transmission 20 is in reverse or forward drive. The spool 282 is then free to move axially in either direction. The position of the spool 282 is then controlled by the forces due to signal pressure bearing on one end and the pressure in the loader actuator chamber 288 bearing on the opposite end. If signal pressure is greater than loader actuator pressure, the spool 282 moves permitting flow from the slip pump 40 to the loader actuator 44. As the pressure in the loader actuator 44 rises and bears on the spool end, it moves the spool 282, upon attaining a pressure slightly in excess of the signal pressure. The spool 282 is then moved so as to block further flow from the slip pump. The spool 282 will slightly overshoot and allow the slight excess of pressure to be relieved by opening the drain port 290. The spool 282 will continue to oscillate until pressures on its ends are exactly equal, thus, achieving the purpose.

If signal pressure decreases, the loader actautor pressure will force the spool 282 to a position opening the drain port 290 and blocking the slip pump fluid port. Draining will continue until loader actuator pressure drops to slightly below the signal pressure. The spool 282 will oscillate as before until pressures are equalized.

*Operation in Neutral.*—Neutral is accompanied by a repositioning of the pre-load piston 286 which results in the pin 284, thereon attached, to move toward the spool 282. This forces the spool 282 to the position where slip pump fluid flow is blocked and loader actuator fluid flow is ported to drain at 290. Thus, flow to the loader actuator 44 is inactivated until the pin 284 is again retracted by application of the pre-load.

*Loader actuator 44*

*Purpose.*—To convert hydraulic pressure to the force necessary for tractive engagement of the discs 30 and 32 in a manner that provides an initial force of minimum value for tractive engagement, and then provides greater forces at minimum values required for various transmitted loads.

*Type.*—Dual, spring loaded, tandem piston hydraulic unit.

*Location.*—Directly adjacent the thrust ring 80 on the driven shaft 34 and connected to such ring by means of the gear rack 88.

*Operation for pre-load.*—When pre-load is applied, the larger piston 94 moves from its position shown in FIG. 11 to its position shown in FIG. 17. It is forced to this posi- by fluid pressure acting on the piston end opposite concentric springs 292 and 294, against whose resistance it moves. The larger spring 292, shown fully compressed in FIG. 17, acts between the piston 94 and the cylinder housing. It moves the piston 94, by extending, in the absence of fluid pressure on the opposite side.

The smaller spring 294 is retained to the piston 94 by a retaining ring 296, but with another ring member 298 interposed. The ring member 298 has an internal diameter greater than its corresponding mounting diameter on the piston 94, and has an outside diameter greater than the inside diameter of the smaller piston 92 facing it. This smaller spring 294 is assembled under compression so that when the pre-load piston 94 is actuated, it moves toward the smaller piston 92 and engages it through the ring member 298 in a manner that transmits identical piston motion until the force resisting movement of the smaller piston 92 exceeds the force due to the initial compression. This occurs before the pre-load piston 94 has traveled its maximum stroke as limited by full compression of its restoring spring 292. Thus, as the pre-load piston 94 continues its travel, the ring member 298 begins to separate axially from the retaining ring 296 and compress the smaller spring 294. Travel of the pre-load piston 94 through its maximum stroke is insured by utilizing sufficiently high actuation pressure. The smaller spring 294 is of low elastic constant so that the resultant pre-load is very nearly the same for slightly different positions of the smaller piston 92 which result from manufacturing tolerances and wear.

On theopposite side of the smaller piston 92, a spring 300 of low elastic constant is placed for the purpose of insuring full piston return upon deactivation of the loader actuator 44.

*Operation for torque-sensitive loading.*—Further application of force above that minimum needed for tractive engagement o fthe discs 30 and 32 is achieved by directing fluid from the loader pressure regulator 254 to bear on the smaller piston 92. The pressure also bears on the pre-load piston 94, but by design selection of the proper pre-load pressure, the resulting force is unable to displace the piston 94 until the piston 92 is free of the effects of forces transmitted through the ring 298, in the manner next described.

Pressure from the loader pressure regulator 254 results in a force on the piston 92 which adds to that caused by the pre-load spring 294 until movement of the piston 92 is sufficient to cause separation of the piston 92 and the aforementioned ring member 298. Movement in excess of this thereafter results in a force directly proportional to pressure from the loader pressure regulator 254.

When both applied pressures are released, the pre-load piston 94 retracts due to action of the larger spring 292 and the piston 92 retracts due to the combined action of a restoring force from the rack 88 and the spring 300 on the opposite side of the piston.

*Inlet-outlet checks 302 for slip pump 40*

Structure and action of the inlet-outlet checks 302 on this side of the slip pump 40 are identical to those of the inlet-outlet checks 238 on the other side except that the flow occurs on a vice versa basis.

*Drive-decelerate switch or valve 226*

*Purpose in pre-load.*—To direct flow to the pre-load side of the loader actuator 44 when conditions allow disc contact.

*Purpose in drive and deceleration.*—To permit mechanical input switching of hydraulic power between the drive and the decelerate circuits when commanded through action of the vehicle control pedal 260.

*Purpose in re-zero.*—To permit a hydraulic override to cause blocking of flow to either the drive or the decelerate circuits and to deactivate the loader actuator 44 when commanded by flow from the ratio range switch 304 when the position of the discs 30 and 32 is in the re-zero range.

*Type.*—A spring biased, multiport, mechanically-controlled-with-hydraulic-override, single spool valve.

*Location.*—Integral to the main valve body.

*Operation in neutral.*—When the shift lever 186 is in neutral, the source of hydraulic power for this valve 226 is cut-off by the neutral switch and pressure regulator 220 and the valve is ineffectual.

*Operation in deceleration.*—The spool 306 of the valve 226 is in the decelerate position as shown. It is supplied with constant pressure fluid from the neutral switch and pressure regulator 220 whenever the shift lever 186 is in either forward or reverse drive.

A pin 308 has been forced into the valve 226 by the power selector cam 264, causing the spool 306 to move against the spring 309 to the position shown. No pressure exists at the hydraulic override port 310. Flow is directed to the deceleration-downshift-rate selector 312 and to the pre-load side of the loader actuator 44. The latter flow passes through an integral check valve 314. Flow is blocked to the drive circuit, or ratio change determiner 316, and to the drain port 318.

Thus, pre-load pressure is applied to the loader actuator 44, and the deceleration circuit is activated, which provides everything needed for deceleration at this point.

*Operation in drive.*—In the drive position of the vehicle control pedal 260, the pin 308 is no longer held in position by the power selector cam 264, the vehicle control pedal having been depressed sufficiently to enter the drive range. Spring force therefore causes the spool 306 to move and the pin 308 to be forced outward, as no pressure exists at the override port 310.

At the most outward position of the pin 308, the spool 306 is in a position which directs flow to the pre-load side of the loader actuator 44, through the check valve 314, and to the ratio change determiner 316. Flow is blocked to the drain port 318 and to the deceleration-downshift-rate selector 312.

Thus, pre-load pressure is applied and the ratio change determiner 316 is activated, which provides all that is necessary for driving at this point.

*Operation in re-zero.*—When the discs 30 and 32 are in the re-zero range, as sensed by the ratio range switch 304, high pressure fluid is applied to the hydraulic override port 310, causing the spool 306 to move in the direction of the spring 309 and compressing the spring to its bottoming position. All flow is now blocked from the neutral switch and pressure regulator 220, thereby deactivating the drive or decelerate circuits and eliminating flow to the pre-load side of the loader actuator 44. Fluid from the pre-load cylinder is ported to drain at 318 through the line 320 and the passage 322 adjacent the check valve 314.

Thus, the drive and decelerate circuits cannot control the position of the movable housing 24 and there exists no force to produce tractive engagement of the discs 30 and 32, allowing the re-zero circuit to completely control the position of the movable housing 24 without resistance or disc engagement.

*Power selector cam 264*

*Purpose in drive and decelerating.*—To provide a mechanical signal for switching between the drive and decelerate circuits as commanded by the position of the vehicle control pedal 260.

*Purpose in connection with engine power.*—To provide a mechanical position signal as a function of engine power desired, by the vehicle operator, to the ratio change determiner 316.

*Type.*—A mechanical rotary cam 264 with input lever 262.

*Location of lever 262.*—The lever 262 is mounted adjacent to the main valve body, but external to the valve body and the transmission 20.

*Location of cam 264.*—The cam 264 is positioned with its rotational axis transverse to the axis of the ratio change determiner 316, inside the main valve body.

*Operation, decelerate.*—The power selector cam 264 is in its decelerate position as shown and is in its counter-clockwisemost position. In this position, a radial face 324 of the cam is holding the pin 308 of the drive-decelerate switch 226 in the decelerate position, thereby effecting deceleration. A cam follower 326 from the ratio change determiner 316 is in contact with the main cam surface 328. The exact position of the follower 326 is not important during deceleration as the ratio change determiner 316 is deactivated.

The cam 264 does not distinguish between neutral, reverse or forward drive as regards the vehicle operation mode.

*Operation, drive.*—Functioning of the main cam surface 328 is to permit the cam follower 326 to move toward the cam rotation center in relation to the engine power desired, as sensed by the vehicle control pedal depression, which causes the power selector cam 264 to rotate in a clockwise direction.

Three distinctions are made on the cam surface 328:

First, during drive-decelerate switching, the main cam surface 328 is without function, this corresponding to the first portion of its clockwise rotation. Being so, the cam surface 328 through this rotation is made a section 330 of a circle, which therefore causes no movement of the cam follower 326.

Second, partial throttle operation begins as soon as switching to drive is completed. During this portion, a moderate increase in engine speed, above normal idle speed, is coordinated with throttle opening by making the cam surface such that it will permit the cam follower to move in slightly during the portion of cam rotation in which the engine throttle opening follows lever movement, this portion being designated 332. If speed exceeds the coordinated increase, the transmission ratio is increased until the load causes the engine to slow to this level.

Third, full engine carburetor throttle opening is reached at the very last position where the opening follows lever movement or cam rotation. Further clockwise movement holds the engine throttle at full opening and permits the cam follower 326 to move inward, along the portion 334, toward the cam center in any prescribed relation to vehicle control pedal position, as determined from considerations of desired sensitivity. The most inward position on the cam surface and placement of the clockwise motion stop 336 are determined from the ratio change determiner properties to be described.

*Deceleration-downshift-rate selector or valve 312*

*Purpose, downshift rate.*—To meter deceleration flow at a minimum rate for slow decelerations and to increase the rate in proportion to pressure in the vehicle hydraulic brake system 338.

*Purpose, engine overspeed protection.*—To insure that downshifting does not result in driving the engine at an excessive speed during deceleration.

*Type.*—A concentric, two spool valve 312 with the position of the inner spool 340 controlled mechanically and the position of the outer spool 342 controlled with hydraulic pressure opposing a bias spring 344.

*Location.*—Integral to the main valve body.

*Operation at minimum normal downshift rate.*—All flow is supplied by the drive-decelerate switch 226. In the position shown, the valve 312 meters flow at the minimum normal rate by permitting flow freely across the spool 342 to a metering orifice 346 directly opposite the inlet 347. This flow joins a fluid line from an adjacent port 348, this port being provided for flow when the downshift rate is to be increased.

*Operation at increased downshift rate.*—Increased flow is provided in response to and in proportion to pressure from the vehicle brake system 338, which is used as an indication that the operator desires greater vehicle retardment. The brake pressure acts on one end of the outer spool 342 against resistance provided by the spring 344 acting on the opposite end of the spool. When the brake pressure overcomes the effort of the spring 344, then the spool 342 moves and begins to gradually open the increased flow port 348. The amount of opening, and thus the amount of flow, is made proportional to the brake pressure by tapering the section of the spool 342 which governs the opening.

*Operation, speed limitations.*—If the vehicle speed is below a nominal value (the threshold speed), the deceleration flow, as achieved above, is permitted to cause downshifting of the transmission ratio. If the vehicle speed is above the threshold value, the flow described from above is returned to the valve 312 by the action of the high-speed-deceleration switch 350. Returned flow enters the port 352 and is permitted to flow through between concentric spools 340 and 342 and a check valve 354 and thence to the downshift circuit, provided only that the ratio is above a certain value.

When the inner spool 340 is in the position shown, and corresponding to a 1:1 ratio, or direct drive, then flow to the downshift circuit is blocked, if returned by the high-speed-deceleration switch 350. It remains blocked until either the vehicle speed decreases to below the aforementioned nominal value, or until enough brake pressure is applied to cause the larger spool to move in a direction which opens the port 356.

When the inner spool 340 is in a position corresponding to a ratio lower than 1:1, blocking of returned flow also occurs and greater brake pressure is required to unblock the flow.

When the inner spool 340 is in a position corresponding to a ratio greater than 1:1, the downshift flow is permitted to pass until the ratio is lowered to 1:1, or slightly less as controlled by the brake pressure effect.

Vehicle control pedal 260

*Purpose.*—To provide foot actuated means for controlling the engine carburetor throttle opening during starting and neutral engine running;

To provide foot actuated means for controlling use of the vehicle engine to drive or to retard the vehicle; and To provide foot actuated means for varying the engine power developed and transmitted to the vehicle's driving wheels.

*Type.*—A lever 260 with connecting linkage 212.

*Location.*—On the floorboard in the operator's section of the passanger compartment.

*Operation.*—In the position shown, the vehicle control pedal 260 is in its fully released position, where it is forced through the efforts of its connecting linkage 212. Motion of the pedal is constrained to rotation about its fulcrum point, shown as a pin connection 358 to the vehicle floorboard. When depressed by the operator's foot, the pedal rotates counterclockwise and causes motion of the connecting linkage 212.

The first portion of the motion gives rise to switching the control circuit from decelerate to drive without any effect on the engine throttle 210.

The second portion of the motion gives rise to a direct relationship between the engine throttle opening, engine speed and pedal position up to the point at which the throttle is fully opened.

The third portion of motion gives rise to a cam follower (326) position signal in relationship to the amount of engine power the operator desires be generated, up to the full capabilities of the engine.

When the pedal is released, it returns to its fully released position and reverses the sequence of events.

Push-start-shift-up switch 202

*Purpose, disc positioning.*—To direct fluid power to cause the transmission 20 to shift to at least a 1:1 ratio before allowing the traction discs 30 and 32 to engage during an engine start through forward vehicle motion, as by pushing, towing, or descending a grade.

*Purpose, disc engagement.*—Provided that the ratio is at 1:1 or greater, to direct fluid power to cause disc engagement and closure of the slip pump throttle 192.

*Type.*—A mechanically controlled sequence valve 202 with two integral check valves 360 and 362.

*Location.*—Integral to main valve body.

*Operation.*—Fluid power originates at the drive-shaft-driven pump 190 during forward vehicle motion. This valve 202 is activated only when the push-start command switch 364 has been actuated by manual command from the operator, which can be done only when the engine is stalled. When the spool 366 is in the position shown, fluid is directed from the push-start command switch 364 to the upshift circuit through the check valve 360. This raises the ratio, from anywhere between full reverse and 1:1 forward, up to 1:1 forward.

At a 1:1 forward ratio of the position input, the spool 366 directs flow to the upshift circuit through the check valve 360, and to the pre-load side of the loader actuator 44 and to the hydraulic override pin 194 of the slip pump throttle 192, through the check valve 362.

A slight increase in the ratio causes the spool 366 to move so as to block the upshift flow through the check valve 360, and to direct all flow to the pre-load side of the loader actuator 44 and to the slip pump throttle 192, causing actuation of both, but also causing a closed path once they are fully actuated. In order that the pressure will not exceed safe limits, and the drive-shaft-driven pump flow will have an escape path, a relief valve, described later, is provided.

Vehicle motion, closure of the slip pump throttle 192, and engagement of the discs 30 and 32, forces the engine to rotate, the desired aim in attempting engine starting. As soon as the engine driven pump 160 builds up pressure, it changes the push-start command switch 364 so that the push-start-shift-up switch 202 is no longer active.

Ratio change determiner or valve 316

*Purpose.*—To direct flow to increase or decrease the transmission ratio, as needed, to permit the engine to operate at the minimum speed for the power desired by the vehicle operator as sensed from position of the power selector cam 264.

*Type.*—A two spool (370 and 372) concentric and spring (373) biased valve 316 with mechanical input (326), and with two integral check valves 374 and 376.

*Location.*—Integral to main valve body.

*Operation.*—The valve 316 is activated when flow is supplied from the drive-decelerate switch 226 to the port 378. Flow to lower the ratio passes through the check valve 374 and flow to raise the ratio passes through the check valve 376.

The spool 372 controlling the opening of the check valve ports has a single position at which flow is blocked against either raising or lowering the ratio. Whether the spool is in the blocked, raise ratio, or lower ratio, positions is determined by the action of the power selector cam 264 and the concentric spools 370 and 372.

From the center of the power selector cam 264 to the spool position corresponding to blocked flow, the length is always constant for a given design. Therefore, if the sum of the lengths of the distance from the cam center to the cam follower 326 and the distance from the cam follower to the spool 372 is equal to the constant length, mentioned above, then the spool 372 will be in the blocked position. The sum of these lengths is dependent upon the cam surface 328, previously described, and upon the amount that the spool bias spring 373 is compressed.

Signal pressure across the engine-speed-variable orifice 162 is directed through the valve 316 to act so as to axially separate the concentric spools 370 and 372 against the resistance of the bias spring 373. Pressure from the lower pressure side of the orifice 162 is directed so as to act in the chamber 379 between the spools 370 and 372 and, through another passage 380, so as to act in the chamber 382 at the valve's closed end. Pressure from the higher pressure side of the orifice 162 is directed into the valve 316, at 384, to act so as to axially separate the concentric spools 370 and 372 against the resistance of the bias spring 373 and the lower pressure mentioned.

This arrangement thus gives rise to the pressure difference across the orifice 162 acting in direct opposition to the bias spring 373, and to the lower pressure acting so as to force the cam follower 326 against the cam surface 328.

In the position shown, the cam follower 326 is in the position where it would be when the vehicle operator desires no engine power, and the engine speed is insufficient to cause the concentric spools 370 and 372 to separate, as would be the case when the engine is idling or stalled.

If the vehicle is at rest with the engine idling (it will be shown that the transmission 20 will be in its lowest possible ratio for these conditions), and the operator then signals for power application through the vehicle control pedal 260, the cam follower 326 will move toward the cam center, taking the spools 370 and 372 with it and uncovering the lower ratio port 374. Simultaneously, the engine throttle opening would increase with a resultant increase in engine speed and commencement of closure of the slip pump throttle 192. Before engine speed increases very much, the slip pump throttle 192 will be completely closed, effecting transmission of power at the lowest ratio. Flow to lower the ratio would be ineffectual for reasons to be subsequently explained.

At the lowest transmission ratio, the maximum vehicle load is incapable of slowing the engine significantly, therefore, the engine speed will continue to increase. This increase in engine speed will give rise to a greater differential pressure signal across the orifice 162 and will cause the concentric spools 370 and 372 to separate. When the increase is sufficient, the spool 372 will be in position to direct flow to raise the ratio, which would be effective. The ratio will continue to increase until high enough that the vehicle load is sufficient to significantly slow the engine and decrease the differential pressure signal. This will continue until the differential pressure signal has decreased to the point where lower or raise ratio flow is blocked and, because of the cam design, will occur when the engine is at its optimum speed, capable of supplying the power desired.

When the vehicle control pedal 260 is further depressed to apply additional power for further acceleration or greater vehicle load, the spool 372 will again uncover the lower ratio port 374 and direct flow to lower the ratio. Engine speed will increase when the ratio is low enough to permit the engine to overcome the vehicle load, and will continue to increase until the differential pressure signal again moves the spool 372 to the blocked flow position.

When less power is required, as sensed from a partial release of the vehicle control pedal 260, the spool 372 will be mechanically moved by the cam surface 328 to a position uncovering the raise ratio port 376. Raising of the ratio will continue until the vehicle load is effective in slowing the engine, decreasing differential pressure and moving the spool 372 to the blocked flow position. Again, this will occur at the minimum engine speed for the power desired.

When the vehicle control pedal 260 is fully released, the ratio change determiner 316 will become completely ineffective due to its power supply being shut off at the drive-decelerate switch 226.

One more important function is provided by the design of the power selector cam 264 and the ratio change determiner 316. The shortest possible distance between the cam follower 326 and the cam center is selected so that when the engine attains the speed corresponding to maximum power, the raise ratio port 376 is held open and will not close until the engine speed drops below the maximum power value. This insures that the engine will not be operated at a speed above its maximum power value as long as the speed can be controlled through the transmission ratio.

High-speed-deceleration switch or valve 350

*Purpose.*—To switch the deceleration flow from one mode to another as a function of vehicle speed so that the vehicle will not have sufficient kinetic energy to overspeed the engine when shifting to low ratios during deceleration.

*Type.*—A differential pressure actuated, spring (386) biased and detent (388) held spool (390) valve 350 with check valve 392.

*Location.*—Integral to main valve body.

*Operation.*—Flow input to the valve 350 is directly from the varible flow rate section of the deceleration-downshift-rate selector 312 and is either permitted to flow through the valve 350 and past the check valve 392, or is returned to the position limiting section of the deceleration-downshift-rate selector 312. An actuating signal pressure is supplied by the differential pressure across the vehicle-speed-variable orifice 394. The higher pressure from this orifice acts in opposition to the bias spring 386, the lower pressure from the orifice, and the detent 388.

In the position shown the differential pressure is insufficient to overcome the various opposing forces and flow is permitted to pass directly through the check valve 392. This position corresponds to the vehicle's having insufficient energy of motion to cause overspeeding of the engine if deceleration downshifting continues.

When vehicle speed is above that which could cause overspeeding the engine, then the differential signal pressure is sufficient to overcome the combined oppositions and the spool 390 moves so as to block flow through the port leading to the check valve 392, and to permit flow through the port 396 leading to the position limiting section of the deceleration-downshift-rate selector 312. This spool movement is rapid because of the action of the ball and spring of the detent 388. When the ball is finally forced to retract, its opposition to spool movement is suddenly reduced to nearly zero. Since the spool moving effort was sufficient to overcome all opposition, it is now considerably greater than the opposition without the detent resistance, and adequate force for rapid full movement is assured.

When the vehicle speed is reduced and the spool 390 begins to return to its slow speed position, rapid action is not necessary, as the vehicle speed is already below the speed which could cause engine overspeeding.

Push-start command switch or valve 364

*Purpose in normal position.*—To direct flow from the drive-shaft-driven pump 190 to a drain port 404 when the engine is operating, or at any time when the push-start signal has not been applied.

*Purpose in push starting.*—To direct flow from the drive-shaft-driven pump 190 to the push start circuit in response to a manual command by an operating lever 398, or equivalent.

*Type.*—A mechanically operated, detent (400) held, spool (402) valve 364 with hydraulic override.

*Location.*—Integral to main valve body.

*Operation.*—Flow to the valve 364 is from the vehicle-speed-variable orifice 394. In the position shown, the push-start command has not been applied and all flow is directed through the valve to drain at 404.

When the push-start lever 398 is actuated by the operator, which is possible only when the engine is not running, the spool 402 is mechanically forced to a position which closes the drain port 404 and directs flow to the port connected to the push-start-shift-up switch 202, which fulfills all that is necessary of the valve 364 for push starting the engine. The spool 402 is held in this position by the detent 400 while the manual lever 398 is permitted to return to its inactive position by springs in the linkage, not shown.

As soon as the engine driven pump 160 builds up pressure due to rotation of the engine, this pressure acting on the spool 402 causes the spool to move to its original position, thereby making the valve 364 ineffective and allowing the normal circuitry to be active.

*Vehicle-speed-variable orifice 394*

*Purpose, vehicle speed signal.*—To provide a differential pressure signal as a function of vehicle speed.

*Purpose, vehicle speed limiting.*—To direct flow to decrease the throttle setting if the vehicle is overspeeded to a point which would allow unsafe operation, engine overspeeding, or transmission overspeeding.

*Type.*—Same as the engine-speed-variable orifice 162.

*Location.*—Integral to main valve body.

*Operation.*—Same as the engine-speed-variable orifice 162, except that the vehicle speed replaces the engine speed and pumping is performed by the drive-shaft-driven pump 190.

*Inlet-outlet checks and pressure relief valve 406*

*Purpose, shift and starter limiting.*—To permit signal flow from the drive-shaft-driven pump 190 to the hydraulic override section of the shift-lock-and-starter-interrupter valve 176 when the vehicle is moving in a forward direction.

*Purpose, fluid supply.*—To permit inlet flow from the case for the drive-shaft-driven pump 190 when the vehicle is moving in the reverse direction.

*Purpose, pressure relief.*—To dissipate flow during a push start after all chambers for the push start have been filled and the pump 190 continues to provide flow.

*Type.*—Two conventional spring loaded ball check valves 408 and 410 and a conventional spring loaded pressure relief poppet valve 412.

*Location.*—Integral to main valve body.

*Operation in forward drive.*—When the vehicle is moving in the forward direction, flow is provided by the drive-shaft-driven pump 190. Pressure of the fluid forces closed the check valve 410 to the drain and forces open the check valve 408 to the shift-lock-and-starter-interrupter valve 176. Flow is also directed to the vehicle-speed-variable orifice 394. Before pressure actually builds up to a value necessary for actuation of the shift-lock-and-starter-interrupter valve 176, resistance to the flow by the vehicle-speed-variable-orifice 394, or resistance to flow in the push-start circuit, must be sufficient for the amount of flow. At extremely low vehicle speeds the amount of flow is very small and does not encounter sufficient resistance for said actuation. At slightly greater vehicle speeds the resistance is sufficient because the flow is greater, and actuation occurs.

During operation in the push-start mode, downstream chambers are filled to capacity shortly after the vehicle is set in motion. When this occurs, pressure from the pump 190 rises and actuates the poppet relief valve 412, directing flow to drain and insuring against further pressure increase.

*Operation in reverse drive.*—When the vehicle is moving in the reverse direction, this side of the drive-shaft-driven pump 190 becomes the inlet or suction side. Suction forces cause the ball check valve 410 to open and fluid to flow from the case to the pump 190. The other two valves 408 and 412 are held closed by the suction forces and by their respective springs. In this mode, the vehicle-speed-variable orifice 394 would close and act to prevent passage of flow from the drain port of the push-start-command switch 364.

*Inlet-outlet checks and pressure relief valve 414*

*Purpose, shift and starter limiting.*—To permit signal flow from the drive-shaft-driven pump 190 to the hydraulic override section of the shift-lock-and-starter-interrupter valve 176 when the vehicle is moving in the reverse direction.

*Purpose, fluid supply.*—To permit inlet flow from the case for the drive-shaft-driven pump 190 when the vehicle is moving in the forward direction.

*Purpose, pressure relief.*—To dissipate flow during reverse vehicle motion after the shift-lock-and-starter-interrupter valve 176 has been actuated.

*Type.*—Two conventional spring loaded ball check valves 416 and 418 and a conventional spring loaded pressure relief poppet valve 420.

*Location.*—Integral to main valve body.

*Operation.*—When the vehicle is moving in the forward direction, flow passes from the check valve 416 to the inlet side of the drive-shaft-driven pump 190. The relief valve 420 and the other check valve 418 are closed by their springs and the pump suction forces.

When the vehicle is moving in the reverse direction, flow is provided by the drive-shaft-driven pump 190 and passes through the check valve 418 to the hydraulic override on the shift-lock-and-starter-interrupter valve 176. After actuation, the pressure rises, due to the closed path, and actuates the pressure relief poppet valve 420. Thus, an outlet is provided for continued flow, but sufficient line pressure is maintained to control the shift-block-and-starter-interrupter valve 176. The check valve 416 is held closed by its spring and the line pressure.

*Reverse switch or valve 422*

*Purpose.*—To switch the raise ratio flow, the lower ratio flow, and the re-zero flow from paths for forward drive to paths for reverse drive.

*Type.*—A mechanically actuated spring (426) biased multiport spool (424) valve 422.

*Location.*—Integral to the main valve body.

*Operation.*—Fluid to the valve 422 is provided from the raise ratio port 376 and the lower ratio port 374 of the ratio change determiner 316, and, for re-zero, from the lower pressure side of the engine-speed-variable orifice 162.

In the position shown, port connections are as they would be for forward operation as held by the bias spring 426. Porting connections are from each of the input lines to the opposing outlet ports closest the shift lever 186, respectively, i.e., to the ports leading to the lines A, C and E, respectively. The remaining ports (B, D and F) are blocked.

When the shift lever 186 is moved to the reverse position, the spool 424 is mechanically forced in the direction which results in spring compression. Ports previously closed are opened and vice versa, thereby effecting a reversal of operation.

*Drive-shaft-driven pump 190*

*Purpose.*—To provide fluid flow in proportion to vehicle speed.

*Type.*—A fixed, positive displacement, shaft driven hydraulic pump.

*Location.*—Within the main valve body section and driven by the accessory drive or power take-off 54. (May also be mounted within the movable housing 24.)

*Ratio range switch or valve 304*

*Purpose.*—To govern flow to the raise ratio, lower ratio, or re-zero circuits so that the movable housing 24 will be limited to operation within its maximum range and to permit shift over, automatically, from the forward range to the reverse range, or vice versa, in a manner preventing contact of the traction discs 30 and 32 when to do so would result in damage.

*Type.*—A mechanically controlled multiport spool (430) valve with four check valves 432, 434, 436 and 438.

*Location.*—Integral to main valve body.

*Operation.*—A tabulation of the range of input positions for which the various ports of the valve 304 are open is shown in the following chart. Possible input positions are shown to include the forward, re-zero and reverse ranges. The ports described on the left side of the tabulation corerspond with the ports on the left side of the ratio range switch 304. Only three of the ports are activated at any one time, depending upon the position of the reverse switch 422. When the reverse switch 422 is in the forward position, the forward ports are active. When the reverse switch 422 is in the reverse drive position, the reverse ports are active.

*Ratio range switch 304*

Port opening vs. movable housing position input

| Port | Movable Housing Position Input | | |
|---|---|---|---|
| | Forward [1] | Re-Zero [1] | Reverse [1] |
| Reverse, Raise Ratio B | | | XXXXXXXXXXX |
| Forward, Lower Ratio C | XXXXXXXXXXX | | |
| Forward, Re-Zero E | | XXXXXXXXXXX | XXXXXXXXXXX |
| Forward, Raise Ratio A | XXXXXXXXXXX | | |
| Reverse, Lower Ratio D | | | XXXXXXXXXXX |
| Reverse, Re-Zero F | XXXXXXXXXXX | XXXXXXXXXXX | |

[1] The relative widths of the forward, re-zero and reverse columns in the above chart do not correspond to the actual relative extents of the forward, re-zero and reverse ranges of the transmission 20.

The operation under various conditions is as follows:

(a) When the reverse switch 422 is in the forward drive position and the position controlled spool 430 is in the position shown, the three forward input ports A, C and E are active, but flow can occur only through the port C, which will lower the ratio in forward. The forward drive flow which would raise the ratio is blocked because the spool 430 position corresponds to the maximum allowable forward ratio.

(b) When the reverse switch 422 is in the reverse drive position and the spool 430 is as shown, the three reverse ports B, D and F are active, but flow can occur only through the port F which would re-zero the transmission 20 to the reverse range. (It should be noted that this would be an infrequent set of conditions because the reverse switch 422 cannot be re-set if the vehicle is moving and only on initial assembly or on an incomplete push start could the ratio get a considerable distance into forward without the deceleration circuit returning it to the lowest possible ratio when the vehicle slows down.) Flow may back up through the reverse, lower ratio line D but will eventually be stopped by the check valves 354, 374 and 392. Flow from the reverse, re-zero line F may also back up through the forward line, but will be stopped by the spool 424 in the reverse switch 422 under these conditions.

(c) If conditions are as described in (a) above, then the ratio would normally be changed when the forward, lower ratio circuit C is activated by either the ratio change determiner 16, or by the deceleration-downshift-rate selector 312. When this occurs, the ratio will be lowered with a resultant change in the spool 430 position. When a small change to lower the ratio occurs, the forward, raise ratio port A is opened, leaving both the forward, raise ratio A and the forward, lower ratio C paths open to flow from the ratio change determiner 316, and, leaving the lower ratio port C open to flow from the deceleration circuit.

(d) If conditions are as described in (b), then the reverse, re-zero flow F will cause several things to occur. The occurrences will be the same as long as the position input is on the forward side of re-zero, or within the re-zero range. Flow will pass to both check valves 436 and 438 opposite the reverse, re-zero port F. Flow through the check valve 436 in line with the port would proceed to the reverse, raise ratio side 440 of the ratio control motor 442 and to the hydraulic actuation side of the drain switch 444 closest the motor, the latter portion allowing flow through the motor to escape to drain. Flow through the adjacent check valve 438 would pass to the drive decelerate switch 226 where it would override the valve 306 and close both the drive and decelerate circuits. This set of flow paths will hold until the movable housing 24 is moved to the transition between re-zero and reverse.

(e) Slightly before the position reached the above transition line, the reverse, raise ratio port B would open but would not have flow because the drive circuit is not activated. Upon reaching the transition line, the reverse, re-zero port F would close and the reverse, lower ratio port D would not yet have opened. As the re-zero port F closes, the drive decelerate switch 226 returns to its normal functioning and activates the drive circuit.

(f) When the drive circuit activates the ratio change determiner 316, fluid is directed to the lower ratio port 374, as described under operation of this valve 316. However, such flow is blocked by the reverse switch spool 424 and cannot move in the direction of a lower ratio which would act in opposition to what the re-zero circuit accomplished.

(g) As soon as the engine speed increases in response to operator command, by depressing the vehicle control pedal 260, the ratio change determiner 316 will direct flow to the raise ratio port 376, as previously described. This would begin to raise the ratio. Upon slight raising of the ratio, the ratio range switch 304 spool 430 would move to uncover the reverse, lower ratio port D and both the raise and lower ratio ports B and D would remain available for reverse driving until the maximum reverse ratio was reached.

(h) as the maximum reverse ratio is reached, the reverse, raise ratio port B is closed, the reverse, lower ratio port D remaining open. Also, similar to the reverse, re-zero port F being open throughout the re-zero and forward range, the forward, re-zero port E is open throughout the re-zero and reverse range.

(i) A set of two check valves 432 and 434 is also provided on the forward, re-zero port E and serves the same functions as the set on the reverse, re-zero port F. Operation of forward re-zero is exactly the same as reverse re-zero, except that the sequence results in flow to the opposite side 446 of the ratio control motor 442 and the housing 24 ends up on the forward side of re-zero.

Drain switches 444 and 448

*Purpose.*—To open the opposite ratio control motor 442 port 440 or 446 so that flow to the motor will be able to pass through the motor and then to the case, since return lines would be blocked.

*Type.*—Hydraulically actuated spring biased spool valves.

*Location.*—Integral to the main valve body.

*Operation.*—Two valves 444 and 448 are arranged as shown. When one is active the other is inactive and vice versa. However, their operation is identical.

When one of the lines 440 or 446 to the ratio control motor 442 becomes pressurized, then the pressure acts on the end of one of the valves 444 or 448 and overcomes spring resistance to open the port from the opposite line to drain. The other valve does not actuate when this occurs because of insufficient pressure in the line which actuates it.

Ratio control motor 442

*Purpose.*—To turn the input shaft 450 of the movable housing positioning means 52 in either direction and at a rate proportional to flow in the pressurized line 440 or 446.

*Type.*—A fixed displacement hydraulic motor of any of the well known types, such as multipiston, gear or vane. The turning action of the motor 442 may be augmented by a clutch, not shown, which is sensitive to line pressure and which engages the motor shaft with an engine driven shaft. This would aid in materially reducing the amount of power which the control circuit must supply, thereby, reducing overall size and cost.

*Location.*—Shaft mounted to the movable housing positioning means 52.

*Operation.*—Pressurized fluid may enter the motor 442 from either port 440 or 446. Pressurization of one port would provide force for rotation in one direction while pressurization of the other port would provide force for rotation in the opposite direction.

As the motor 442 is fixed displacement, its speed is directly proportional to flow. Therefore, line flow is directly proportional to the turning rate.

CONCLUSION

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. In a variable ratio friction transmission, the combination of: driving and driven discs rotatable about central axes and positioned in oblique facing relation and having surfaces at least one of which is a surface of revolution generated by rotating a curve about the axis of the corresponding disc, and which are frictionally engageable over an area that is small as compared to the areas of said surfaces, the distances from the centers of said discs to the area of contact between said surfaces of said discs both being variable; and means for varying the distances between the centers of said discs and said area of contact, the centers of said discs both being on the same side of said area of contact.

2. In a variable ratio friction transmission, the combination of: rigid driving and driven discs rotatable about central axes and positioned in oblique facing relation and having surfaces at least one of which is a surface of revolution generated by rotating a curve about the axis of the corresponding disc, and which are frictionally engageable with substantially point contact therebetween, the distances from the centers of said discs to the point of contact between said surfaces of said discs both being variable; and means for varying the distances between the centers of said discs and said point of contact, the centers of said discs both being on the same side of said point of contact.

3. In a variable ratio friction transmission, the combination of: rigid driving and driven discs rotatable about central axes and positioned in facing relation and having surfaces at least one of which is a surface of revolution generated by rotating a curve about the axis of the corresponding disc, and which are frictionally engageable with substantially point contact therebetween, the distances from the centers of said discs to the point of contact between said surfaces of said discs both being variable; and means for shifting the point of contact between said surfaces of said discs through a range of positions between the centers of said discs and through a range of positions wherein the centers of said discs are on the same side of said point of contact.

4. In a variable ratio friction transmission, the combination of: rigid driving and driven discs rotatable about central axes and positioned in facing relation and having surfaces at least one of which is a surface of revolution generated by rotating a curve about the axis of the corresponding disc, and which are frictionally engageable with substantially point contact therebetween, the distances from the centers of said discs to the point of contact between said surfaces of said discs both being variable; and means for shifting the point of contact between said surfaces of said discs through a range of positions between the centers of said discs and through a range of positions wherein the centers of said discs are on the same side of said point of contact, the distance from the center of said driving disc to said point of contact varying, in one of said ranges of positions, from values less than to values greater than the distance from the center of said driven disc to said point of contact.

5. In a variable ratio friction transmission, the combination of: rigid driving and driven discs rotatable about central axes and positioned in facing relation and having surfaces at least one of which is a surface of revolution generated by rotating a curve about the axis of the corresponding disc, and which are frictionally engageable with substantially point contact therebetween, the distances from the centers of said discs to the point of contact between said surfaces of said discs both being variable; and means, including shifting means connected to one of said discs for varying the distance between the centers of said discs and the angle between the axes of rotation thereof, for shifting the point of contact between said surfaces of said discs through a range of positions between the centers of said discs and through a range of positions wherein the centers of said discs are on the same side of said point of contact, the distance from the center of said driving disc to said point of contact varying, in one of said ranges of positions, from values less than to values greater than the distance from the center of said driven disc to said point of contact.

6. In a variable ratio friction transmission, the combination of: rigid driving and driven discs rotatable about central axes and positioned in facing relation and having surfaces which are frictionally engageable with substantially point contact therebetween, said surface of said driving disc being a segment of a spherical surface the center of which lies on the axis of said driving disc and the radius of which is large as compared to the diameter of said driving disc, the distances from the centers of said discs to the point of contact between said surfaces of said discs both being variable; and means, including shifting means connected to one of said discs for varying the distance between the centers of said discs and the angle between the axes of rotation thereof, for shifting the point of contact between said surfaces of said discs through a range of positions between the centers of said discs and through a range of positions wherein the centers of said discs are on the same side of said point of contact, the distance from the center of said driving disc to said point of contact varying, in one of said ranges of positions, from values less than to values greater than the distance from the center of said driven disc to said point of contact.

7. In a variable ratio friction transmission, the combination of: rigid driving and driven discs rotatable about central axes and positioned in facing relation and having surfaces which are frictionally engageable with substantially point contact therebetween, said surface of said driving disc being a segment of a spherical surface the center of which lies on the axis of said driving disc and the radius of which is large as compared to the diameter of said driving disc, the distances from the centers of said discs to the point of contact between said surfaces of said discs both being variable; and means, including shifting means connected to said driven disc for varying the distance between the centers of said discs and the angle between the axes of rotation thereof, for shifting the point of contact between said surfaces of said discs through a range of positions between the centers of said discs and through a range of positions wherein the centers of said discs are on the same side of said point of contact, the distance from the center of said driving disc to said point of contact varying, in one of said ranges of positions, from values less than to values greater than the distance from the center of said driven disc to said point of contact.

8. In a variable ratio friction transmission, the combination of: rigid driving and driven discs rotatable about central axes and positioned in facing relation and having surfaces at least one of which is a surface of revolution generated by rotating a curve about the axis of the corresponding disc, and which are frictionally engageable with substantially point contact therebetween, the distances from the centers of said discs to the point of contact between said surfaces of said discs both being variable; and means for shifting the point of contact between said surfaces of said discs through a range of positions between the centers of said discs and through a range of positions wherein the centers of said discs are on the same side of said point of contact, and substantially along a line extending through the centers of said discs in the plane of engagement thereof.

9. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; and means, including shifting means interconnecting said inner and outer housings for moving said inner housing within said outer housing, for shifting the point of contact between said surfaces of said discs through a range of positions between the centers of said discs and through a range of positions wherein the centers of said discs are on the same side of said point of contact.

10. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; and means, including shifting means interconnecting said inner and outer housings for moving said inner housing within said outer housing, for shifting the point of contact between said surfaces of said discs through a range of positions between the centers of said discs and through a range of positions wherein the centers of said discs are on the same side of said point of contact, said shifting means including track means on one of said housings, track follower means on the other of said housings and engaging said track means, and means for causing relative movement of said track means and said track follower means.

11. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; and shifting means interconnecting said housing for moving said inner housing within said outer housing to shift the location of the point of contact between said surfaces of said discs relative to the centers of said discs.

12. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; shifting means interconnecting said housings for moving said inner housing within said outer housing to shift the location of the point of contact between said surfaces of said discs relative to the centers of said discs; an output shaft carried by and rotatable relative to said inner housing and projecting from said outer housing; and a driving connection between said driven and output shafts within said inner housing.

13. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; shifting means interconnecting said housings for moving said inner housing within said outer housing to shift the location of the point of contact between said surfaces of said discs relative to the centers of said discs; a high-friction-coefficient coolant fluid in said outer housing and contacting said inner housing and said discs; a low-friction-coefficient lubricating fluid in said inner housing; and sealing means for confining said coolant and lubricating fluids within said outer and inner housings, respectively, and for preventing intermingling thereof.

14. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; shifting means interconnecting said housings for moving said inner housing within said outer housing to shift the location of the point of contact between said surfaces of said discs relative to the centers of said discs; and cam means responsive to the torque transmitted to said driven shaft for biasing said surface of said driven disc into frictional engagement with said surface of said driving disc with a force which is a function of the torque transmitted to said driven shaft.

15. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; shifting means interconnecting said housings for moving said inner housing within said outer housing to shift the location of the point of contact between said surfaces of said discs relative to the centers of said discs; cam means responsive to the torque transmitted to said driven shaft for biasing said surface of said driven disc into frictional engagement with said surface of said driving disc with a force which is a function of the torque transmitted to said driven shaft; and means for preventing frictional engagement between said surfaces of said discs when the point of contact therebetween approaches the center of said driving disc.

16. In a variable ratio friction transmission, the combination of: rigid driving and driven discs rotatable about central axes and positioned in facing relation and having surfaces which are frictionally engageable with substantially point contact therebetween; means for shifting the point of contact between said surfaces of said discs through a range of positions between the centers of said discs and through a range of positions wherein the centers of said discs are on the same side of said point of contact; means responsive to the torque transmitted to said driven disc for biasing said surfaces of said discs into frictional engagement with a force which is a function of the torque transmitted to said driven disc; and means for preventing frictional engagement between said surfaces of said discs when the point of contact therebetween approaches the center of said driving disc.

17. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; shifting means interconnecting said housings for moving said inner housing within said outer housing to shift the location of the point of contact between said surfaces of said discs relative to the centers of said discs; an output shaft carried by and rotatable relative to said inner housing and projecting from said outer housing, said output shaft being parallel to said driven shaft and being located in a region where movement of said inner housing relative to said outer housing axially of said output shaft is a minimum; an engageable and disengageable driving connection between said output and driven shafts; and means for engaging and disengaging said driving connection.

18. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; shifting means interconnecting said housings for moving said inner housing within said outer housing to shift the location of the point of contact between said surfaces of said discs relative to the centers of said discs; an output shaft carried by and rotatable relative to said inner housing and projecting from said outer housing, said output shaft being parallel to said driven shaft and being located in a region where movement of said inner housing relative to said outer housing axially of said output shaft is a minimum; and an engageable and disengageable driving connection between said output shaft and said driven shaft, said driving connection including pump and differential means interconnecting said driven and output shafts.

19. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; shifting means interconnecting said housings for moving said inner housing within said outer housing to shift the location of the point of contact between said surfaces of said discs relative to the centers of said discs; cam means responsive to the torque transmitted to said driven shaft for biasing said surface of said driven disc into frictional engagement with said surface of said driving disc with a force which is a function of the torque transmitted to said driven shaft, said cam means including two relatively rotatable rings encircling said driven shaft and respectively acting on said driven shaft and said inner housing, said cam means further including radially oriented rollers of noncircular cross section between said rings; and means responsive to the torque transmitted to said driven shaft for rotating one of said rings relative to the other.

20. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; and means, including shifting means interconnecting said inner and outer housings for moving said inner housing within said outer housing, for shifting the point of contact between said surfaces of said discs through a range of positions between the centers of said discs and through a range of positions wherein the centers of said discs are on the same side of said point of contact, said shifting means including track means on one of said housings, track follower means on the other of said housings and engaging said track means, and means for causing relative movement of said track means and said track follower means, including a gear on said inner housing, a gear rotatably mounted on said outer housing and meshed with said gear on said inner housing, and means for rotating the gear last mentioned.

21. In a variable ratio friction transmission, the combination of: an outer housing; an inner housing movable within said outer housing; a driving shaft rotatable relative to said outer housing; a driven shaft carried by and rotatable relative to said inner housing, the axes of said driving and driven shafts extending in the same general direction; rigid driving and driven discs respectively carried by and rotatable about the axes of said driving and driven shafts, said discs being located within said outer housing and without said inner housing and being positioned in facing relation, and said discs having surfaces which are frictionally engageable with substantially point contact therebetween; shifting means interconnecting said housings for moving said inner housing within said outer housing to shift the location of the point of contact between said surfaces of said discs relative to the centers of said discs; an output shaft carried by and rotatable relative to said inner housing and projecting from said outer housing; a driving connection between said driven and output shafts within said inner housing; and a power take-off connected to said output shaft and extending from the interior of said inner housing to the exterior of said outer housing.

22. In combination: an engine; rotary driven means; an infinitely variable ratio transmission coupling said rotary driven means to said engine; actuable by the application of fluid pressure thereto for braking said rotary driven means; means for varying the ratio of said transmission; and means responsive to the fluid pressure actually applied to said braking means for varying the rate of variation of the ratio of said transmission as a continuous function of time.

23. In combination: an engine; rotary driven means; a variable ratio transmission coupling said rotary driven means to said engine; manually-operable fuel control means for varying the fuel setting for said engine; means responsive to the speed of said rotary driven means, and connected to said fuel control means, for overriding the manual fuel setting and reducing the fuel setting whenever the speed of said rotary driven means exceeds a predetermined limiting speed; and means for increasing the fuel setting only when the speed of said rotary driven means decreases below said predetermined limiting speed.

24. In combination: an engine; rotary driven means; a variable ratio transmission coupling said rotary driven means to said engine; means for sensing the torque transmitted by said transmission and means responsive to the sensed torque for preventing the transmittal of excessive engine torque through said transmission to said rotary driven means.

25. In combination: an engine; rotary driven means; a variable ratio transmission coupling said rotary driven means to said engine, including frictionally engageable traction discs; and means for producing a fluid pressure which is directly proportional to the traction force divided by the coefficient of traction, and a safety margin, the magnitude of said safety margin being a preselected function varying with the traction force and the radius to contact between said discs from the axis of the driven disc, so as to prevent slippage between said discs even during dynamic loading conditions.

26. In combination: an engine; rotary driven means; operator controlled means to supply an initial engagement signal; a variable ratio transmission coupling said rotary driven means to said engine, said transmission including traction driven means, secondary engagement means for said traction driven means, and initial engagement means for said traction driven means and responsive to said initial engagement signal for engaging said traction driven means while said secondary engagement means is disengaged.

27. In combination: an engine; rotary driven means; an infinitely variable ratio, friction transmission coupling said rotary driven means to said engine, said transmission including pressure operated means for engaging it; means for delivering pressure to said pressure operated means to produce initial engagement of said transmission; means for supplying pressure to said pressure operated means in proportion to the torque transmitted by said transmission after initial engagement thereof; and means for preventing the delivery of pressure to said pressure operated means when said transmission is not in a condition for engagement.

28. In combination: an engine; rotary driven means; a variable ratio transmission coupling said rotary driven means to said engine; control means for varying the ratio of said transmission; a manually operated control member; means connecting said control member to said engine for controlling said engine; and cam means directly connected mechanically to said control member and mechanically directly interconnecting said control member and said control means.

29. In combination: an engine; rotary driven means; a variable ratio transmission coupling said rotary driven means to said engine; means independent of engine speed for continuously downshifting the ratio of said transmission during deceleration of said rotary driven means; means for preventing said continuous downshifting of said ratio when the speed of said rotary driven means is above a predetermined minimum and the ratio of said transmission is above a predetermined minimum; and means for permitting said downshifting after the speed of said rotary driven means decreases below its said predetermined minimum.

30. In combination: an engine; rotary driven means; a variable ratio transmission coupling said rotary driven means to said engine; means for engaging said transmission in response to externally-produced motion of said rotary driven means; and means for preventing engagement of said transmission when the ratio thereof is below about 1:1.

31. In combination: an engine; rotary driven means; a variable ratio transmission coupling said rotary driven means to said engine; means independent of engine speed for downshifting the ratio of said transmission in response to deceleration of said rotary driven means; and means for preventing downshifting of said ratio unless the speed of said engine is below a predetermined maximum.

32. In combination: an engine; rotary driven means; an infinitely variable ratio transmission coupling said rotary driven means to said engine; a manually operated control member movable to selected positions corresponding to predetermined engine power outputs for any power output up to the maximum of which the engine is capable; actuating means independent of said rotary driven means, and variably responsive to the position of the control member throughout the entire operating speed range of said engine for increasing or decreasing the transmission ratio; and means for varying the responsiveness of said actuating means with variations in operating conditions.

33. In a variable ratio friction transmission, the combination of: rigid driving and driven discs rotatable about central axes and positioned in oblique facing relation and having surfaces at least one of which is a surface of revolution generated by rotating a curve about the axis of the corresponding disc, and which are frictionally engageable with substantially point contact therebetween, the distances from the centers of said discs to the point of contact between said surfaces of said discs both being variable; and means for varying the distances between the centers of said discs and said point of contact while maintaining constant the angular positional relationship between the central axes of said discs.

34. In a variable ratio friction transmission, the combination of: rigid driving and driven discs rotatable about central axes and positioned in oblique facing relation and having surfaces at least one of which is a surface of revolution generated by rotating a curve about the axis of the corresponding disc, and which are frictionally engageable with substantially point contact therebetween, the distances from the centers of said discs to the point of contact between said surfaces of said discs both being variable; and means for varying the distances between the centers of said discs and said point of contact, including means for orbiting said driven disc about an axis differing from, but approximately parallel to, its own axis while maintaining the axes of said discs at least approximately coplanar.

35. In a variable ratio friction transmission, the combination of: frictionally engageable driving and driven discs one of which is movable relative to the other in a direction to engage and disengage said discs; and means for moving said one disc toward the other in said direction, comprising two parallel thrust members having plane surfaces separated by roller cams of noncircular cross section, one of said thrust members being stationary, bearing means connecting the other of said thrust members to said one disc, and said other thrust member being movable parallel to itself to cause said roller cams to vary the spacing between said thrust members.

36. In combination: an engine; rotary driven means; a variable ratio transmission coupling said rotary driven means to said engine; fluid circuit means for controlling the ratio of said transmission when said engine is developing power; and a separate fluid circuit means for downshifting the ratio of said transmission during deceleration of said rotary driven means throughout the entire operating speed range of the engine and independently of the speed of the engine.

37. The combination set forth in claim 36 including means for interrupting downshifting of said ratio under various operating conditions.

38. In a variable ratio friction transmission, the combination of: frictionally engageable driving and driven discs rotatable about central axes and frictionally engageable with substantially point contact therebetween at varying distances from the centers of said discs; an output shaft; and means for transmitting torque from said driven disc to said output shaft, including planetary differential means, pump means connected to said differential means, and means for variably resisting the discharge of said pump means and for reflecting such resistance in amplified form to said output shaft.

39. The combination set forth in claim 38 including means responsive to the speed of said driving disc for varying said resistance smoothly with variations in the speed of said driving disc above a predetermined minimum.

40. The combination set forth in claim 38 including means responsive to variations in said resistance for varying the normal force between said discs.

41. The combination set forth in claim 40 including means for varying the reflection of said resistance in inverse proportion to the distance of said point of contact between said discs from the center of said driven disc.

42. In combination: an engine having a fuel control; rotary driven means; an infinitely variable ratio transmission coupling said rotary driven means to said engine; manually operated control means movable to selected positions corresponding to predetermined engine power outputs for setting the fuel control of said engine; and means responsive to the speed of said engine for overriding said manually operated control means and causing a reduction in the setting of said fuel control whenever the speed of said engine exceeds a predetermined maximum, so as to limit the input speed to said transmission and to prevent said engine from operating above its speed corresponding to maximum power.

43. In combination: an engine; rotary driven means; an infinitely variable ratio friction transmission coupling said rotary driven means to said engine, said transmission including a variable slippage coupling; and means to gradually actuate said variable slippage coupling, in response to increasing speed of said engine while said friction transmission is in a low speed ratio position, so as to vary slippage smoothly from a freely running condition to a fully locked condition.

44. In combination: an engine provided with fuel setting means; rotary driven means; an infinitely variable ratio transmission coupling said rotary driven means to said engine; manually operable means movable to selected positions corresponding to predetermined engine power outputs up to the maximum of which said engine is capable; means to control the fuel setting to a value corresponding to the most economical engine speed at which each of said power outputs may be developed by said engine; means to compare the actual engine speed to said most economical engine speed, including means to produce a first signal when the actual speed is too low, and including means to produce a second, different signal when the actual speed is too high; means to cause said transmission to downshift in response to said first signal; and means to cause said transmission to upshift in response to said second signal.

45. In combination: an engine provided with fuel setting means; rotary driven means; a variable ratio transmission coupling said rotary driven means to said engine; manually responsive control means for controlling said fuel setting means; means for sensing excessive loading of said transmission; and damping means, incorporating override control means, for damping movement of said fuel setting means and for overriding the effects of the manually responsive control means and decreasing the fuel setting in response to excessive loading of said transmission.

46. In combination: an engine; rotary driven means; a variable ratio transmission coupling said rotary driven means to said engine; fluid circuit means for controlling the ratio of said transmission when said engine is developing power; a separate fluid circuit means for downshifting the ratio of said transmission during deceleration of said rotary driven means throughout the entire operating speed range of the engine; means for interrupting downshifting of said ratio under various operating conditions; fluid-pressure-operated means for braking said rotary driven means; and means responsive to the fluid pressure in said braking means for overriding said interrupting means.

47. In combination: an engine; rotary driven means; a variable ratio transmission coupling said rotary driven means to said engine; fluid circuit means for controlling the ratio of said transmission when said engine is developing power; a separate fluid circuit means for downshifting the ratio of said transmission during deceleration of said rotary driven means throughout the entire operating speed range of the engine; and cam means for controlling both of said fluid circuit means.

48. The combination set forth in claim 47 wherein the ratio of said transmission is variable in both the forward and reverse directions of movement of said rotary driven means, the combination including reversing means for switching between the forward and reverse ratio ranges.

49. In a variable ratio friction transmission, the combination of: rotary, frictionally interengageable, driving and driven means; two supporting means for respectively rotatably supporting said driving and driven means; means for frictionally interengaging said driving and driven means; means for lubricating said supporting means for said driven means with a high-lubricity lubricant; means for cooling said driving and driven means with a liquid of lower lubricity than said lubricant; and means for preventing intermingling of said lubricant and said liquid.

References Cited by the Examiner
UNITED STATES PATENTS

| | | | |
|---|---|---|---|
| 900,111 | 10/1908 | Million | 74—199 |
| 1,429,528 | 9/1922 | Payne | 74—513 X |
| 1,699,115 | 1/1929 | Murphy | 74—191 |
| 2,071,785 | 2/1937 | Ehrlich. | |
| 2,089,590 | 8/1937 | Walti. | |
| 2,108,666 | 2/1938 | Hall | 74—472 |
| 2,289,871 | 7/1942 | Bieretz | 74—472.1 |
| 2,310,518 | 2/1943 | Dolza. | |
| 2,337,910 | 12/1943 | Maybach | 74—472.1 |
| 2,380,677 | 7/1945 | Schjolin | 74—526 X |
| 2,500,580 | 3/1950 | Segsworth. | |
| 2,523,726 | 9/1950 | Seeger. | |
| 2,586,260 | 2/1952 | Rennerfelt | 74—200 X |
| 2,653,487 | 9/1953 | Martin et al. | |
| 2,707,405 | 5/1955 | Forster | 74—472.1 |
| 2,803,975 | 8/1957 | Akerman et al. | 74—472.4 |
| 2,842,973 | 7/1958 | Crowe | 74—190.5 |
| 2,855,794 | 10/1958 | Faisandier | 74—472.4 |
| 2,872,000 | 2/1959 | Herndon et al. | |
| 3,006,206 | 10/1961 | Kelley et al. | 74—472.1 |

FOREIGN PATENTS

| | | |
|---|---|---|
| 975,134 | 10/1950 | France. |
| 789,023 | 1/1958 | Great Britain. |

DON A. WAITE, *Primary Examiner.*

BROUGHTON G. DURHAM, *Examiner.*

UNITED STATES PATENT OFFICE
CERTIFICATE OF CORRECTION

Patent No. 3,225,617　　　　　　　　　　　　　　December 28, 1965

James R. Young

It is hereby certified that error appears in the above numbered patent requiring correction and that the said Letters Patent should read as corrected below.

Column 3, line 37, for "or" read -- for --; column 6, line 55, for "it" read -- is --; column 8, line 74, for "Wih" read -- With --; column 15, line 2, for "said" read -- solid --; column 19, line 32, for "rflected" read -- reflected --; column 22, line 53, for "enegine" read -- engine --; column 27, line 24, for "drive-shaft-driven-pump", in italics, read -- drive-shaft-driven pump --, in italics; column 33, line 19, for "controrl" read -- control --; column 34, line 74, for "ffow" read -- flow --; column 35, line 42, for "passanger" read -- passenger --; column 40, line 74, for "corerspond" read -- correspond --; column 41, line 61, for "determiner 16" read -- determiner 316 --; column 42, line 65, for "as" read -- As --; column 49, line 39, before "actuable" insert -- means --; same column 49, line 61, for "transmission and" read -- transmission; and --.

Signed and sealed this 29th day of November 1966.

(SEAL)
Attest:

ERNEST W. SWIDER　　　　　　　　　　　　　　EDWARD J. BRENNER
Attesting Officer　　　　　　　　　　　　　　Commissioner of Patents